(12) United States Patent
Yu

(10) Patent No.: US 7,031,341 B2
(45) Date of Patent: Apr. 18, 2006

(54) INTERFACING APPARATUS AND METHOD FOR ADAPTING ETHERNET DIRECTLY TO PHYSICAL CHANNEL

(75) Inventor: Shaohua Yu, Wuhan (CN)

(73) Assignee: Wuhan Research Institute of Post and Communications, Mii., Hubei (CN)

( * ) Notice: Subject to any disclaimer, the term of this patent is extended or adjusted under 35 U.S.C. 154(b) by 882 days.

(21) Appl. No.: 09/817,269

(22) Filed: Mar. 27, 2001

(65) Prior Publication Data
US 2001/0043603 A1 Nov. 22, 2001

Related U.S. Application Data

(63) Continuation-in-part of application No. PCT/CN00/00211, filed on Jul. 26, 2000.

(51) Int. Cl.
*H04J 3/16* (2006.01)
*H04J 3/22* (2006.01)
(52) U.S. Cl. ............. 370/469; 370/473; 370/465
(58) Field of Classification Search ............. 370/465, 370/466, 907, 473, 474, 469
See application file for complete search history.

(56) References Cited

U.S. PATENT DOCUMENTS

| 4,930,123 | A | * | 5/1990 | Shimizu | 370/389 |
| 5,208,811 | A | * | 5/1993 | Kashio et al. | 370/401 |
| 5,323,392 | A | * | 6/1994 | Ishii et al. | 370/466 |
| 6,014,708 | A | * | 1/2000 | Klish | 709/232 |
| 6,041,042 | A | | 3/2000 | Bussiere | |
| 6,414,966 | B1 | * | 7/2002 | Kulkarni et al. | 370/465 |
| 6,496,519 | B1 | * | 12/2002 | Russell et al. | 370/465 |
| 6,542,516 | B1 | * | 4/2003 | Vialen et al. | 370/465 |
| 6,584,118 | B1 | * | 6/2003 | Russell et al. | 370/466 |
| 6,603,770 | B1 | * | 8/2003 | Lin et al. | 370/401 |
| 6,690,679 | B1 | * | 2/2004 | Turunen et al. | 370/469 |
| 6,804,248 | B1 | * | 10/2004 | Tomar et al. | 370/401 |
| 2001/0012288 | A1 | * | 8/2001 | Yu | 370/352 |
| 2002/0085563 | A1 | * | 7/2002 | Mesh et al. | 370/393 |

FOREIGN PATENT DOCUMENTS

EP 0 981 260 A2 2/2000
JP 11-252108 9/1999

* cited by examiner

*Primary Examiner*—Chi Pham
*Assistant Examiner*—Blanche Wong
(74) *Attorney, Agent, or Firm*—Sughrue Mion, PLLC

(57) ABSTRACT

The present invention discloses an interfacing apparatus and method for adapting Ethernet directly to physical channel, which encapsulates MAC frames into SDH/SONET SPE/VC using LAPS. The LAPS encapsulation consists of the start Flag Sequence, address field (SAPI, Service Access Point Identifier), control field (0x03), Information field (Ipv4, Ipv6, or PPP protocol data unit), FCS (Frame check sequence) and the ending Flag Sequence. The Flag Sequence (0x7E) identifies the beginning/end of a LAPS frame. The present invention can be used to provide Ethernet interface in telecom SDH/SONET transmission device or provide facilities to remote access datacom device, such as core and edge routers, switch devices, IP based network accessing equipment, line cards, and interfacing units used in high speed application, e.g. Gigabit applications. By simplification of SDH/SONET, i.e. using simplified SDH/SONET, Ethernet could be applied to DWDM.

91 Claims, 16 Drawing Sheets

ADM = Add and drop Multiplx

INTERFACING APPARATUS AND METHOD FOR ADAPTING ETHERNET DIRECTLY TO PHYSICAL CHANNEL

This is a Continuation-In-Part of Application No. PCT/CN00/00211 filed Jul. 26, 2000, the disclosure of which is incorporated herein by reference.

FIELD OF THE INVENTION

The present invention relates to a data network and a telecom network related to Internet/Intranet and LANs, and specifically, relates to an interfacing apparatus and method for adapting Ethernet directly to a physical channel, providing an Ethernet interface in a telecom SDH/SONET transmission device or providing facilities to remote access datacom devices, such as core and edge routers, switch devices, IP based network accessing equipment, line cards, and interfacing units used in high speed applications, e.g. adapting a MAC frame directly to SDH/SONET.

BACKGROUND OF THE INVENTION

There is a need for expanding the scope of Ethernet area, including Ethernet, fast Ethernet, Gigabit Ethernet. Transferring Ethernet (defined by IEEE WG 802.3) over telecom physical channel is a simple and cheap technique to connect LANs, Internet/Intranet within a private and public network.

ITU-T G.707 describes the advantages offered by SDH and multiplexing method, and specifies a set of SDH bit rates, the general principles and frame structure of the network node interface (NNI), the overall frame size of 9 rows by N*270 columns, the section overhead(SOH) together with its byte allocation, arrangements for international interconnection of synchronous transport modules (STMs), the formats for multiplexing and mapping elements into the STM-N at the NNI.

The North America equivalent of SDH is SONET. SONET is the U.S. (ANSI) standard for synchronous data transmission on optical media. People ensure standards so that digital networks can interconnect internationally and that existing conventional transmission systems can take advantage of optical media through tributary attachments. SONET defines a base rate of 51.84 Mbps and a set of multiples of the base rate known as Optical Carrier Levels. The SONET is an octet-synchronous multiplex scheme that defines a family of standard rates and formats. Despite the name, it is not limited to optical links. Electrical specifications have been defined for single-mode fiber, multi-mode fiber, and CATV 75 ohm coaxial cable. The transmission rates are integral multiples of 51.840 Mbps, which may be used to carry T3/E3 bit-synchronous signals. It is also strong recommended to use G.703 E1/E3/E4/T1/E2/T4 interfaces as physical layer of IP-over-SDH/SONET. It is convenient user access way via LAN.

Both SDH and SONET provide standard for a number of line rates up to the maximum line rate of 9.953 gigabits per second (Gbps). Actual line rates approaching 20 gigabits per second are possible.

Existing data communication architecture of combination Ethernet with SDH/SONET uses PPP (point-to-point protocol) together with HDLC (high level data link control procedure). It is specified as RFC1619 in the IETF (Internet Engineering Task Force). However, when applying to the combination of Ethernet/Fast Ethernet/Gigabit Ethernet with SDH/SONET, RFC1619 presents following main defects:

(1) The whole application scheme has not been supported by a unified international standard, which results in the devices of different manufactures could not be unified when interconnected within a private or public network;
(2) for 2.5 Gbps rate or up, the overhead of hardware forwarding section is too heavy, especially for IP over WDM, since it is recommended to use LCP (link control protocol) and Magic Number both of which are very complicated, in RFC1619;
(3) in case the RFC1619 is used, the default value of the retransmission timer is 3 second in PPP, which is too slow for high speed link. For specific engineering applications, it is required to support all the rate range from 2M bit/sec to 1000M bit/sec (change about 4032 times), therefore the value of the retransmission timer should be determined based on the round-trip delay along the line. However, it is not defined in the RFC1619, resulting uncertainty when interconnecting equipment from different vendors;
(4) LCP contains 10 configuration packets, 16 events and 12 actions, and more than 130 protocol states, which is difficult and costly to implement for optical packet exchange between MII and SDH/SONET. For illustrating the above, Table 1 shows the list of Events and Actions using the conventional PPP over SONET/SDH standard on finite-state machine of LCP; and
(5) the padding field of PPP is almost not used in the case of IP over SDH/SONET, but it still kept now in RFC 2615. In addition, this padding field requires a function at the receiver side to distinguish between information field and padding field which would have been defined in RFC standard, and at the same time which in turn increases the processing overhead.

The most important feature of Ethernet over SDH/SONET (EOS) is that
(a) It will be used to both SONET/SDH telecom networks and Ethernet based datacom networks.
   SONET/SDH equipment with Ethernet interface of long distance from site to site,
   Ethernet switch with SONET/SDH interface.
(b) Add and drop 10/100M Ethernet when multi-chip is applied at the SONET/SDH terminal.
(c) It will be also used to linecard of Giga-router.

TABLE 1

The list of Events and Actions

| Events | | Actions | |
|---|---|---|---|
| Up | = lower layer is Up | tlu | = This-Layer-Up |
| Down | = lower layer is Down | tld | = This-Layer-Down |
| Open | = administrative Open | tls | = This-Layer-Started |
| Close | = administrative Close | tlf | = This-Layer-Finished |
| TO+ | = Timeout with counter > 0 | irc | = Initialize-Restart-Count |
| TO− | = Timeout with counter expired | zrc | = Zero-Restart-Count |
| RCR+ | = Receive-Configure-Request (Good) | scr | = Send-Configure-Request |
| RCR− | = Receive-Configure-Request (Bad) | | |
| RCA | = Receive-Configure-Ack | sca | = Send-Configure-Ack |
| RCN | = Receive-Configure-Nak/Rej | scn | = Send-Configure-Nak/Rej |
| RTR | = Receive-Terminate-Request | str | = Send-Terminate-Request |
| RTA | = Receive-Terminate-Ack | sta | = Send-Terminate-Ack |
| RUC | = Receive-Unknown-Code | scj | = Send-Code-Reject |
| RXJ+ | = Receive-Code-Reject (permitted) or Receive-Protocol-Reject | | |
| RXJ− | = Receive-Code-Reject (catastrophic) or Receive-Protocol-Reject | | |

TABLE 1-continued

The list of Events and Actions

| Events | | Actions | |
|---|---|---|---|
| RXR | = Receive-Echo-Request<br>or Receive-Echo-Reply<br>or Receive-Discard-Request | ser | = Send-Echo-Reply |

It could be seen from above analysis that the existing method to combine Ethernet with SDH/SONET is complex, difficult and expensive to implement, slow, unstable, and not suit for high speed data transmission, especially for Gigabit rate application.

DISCLOSURE OF THE INVENTION

Accordingly, a primary object of the present invention is to provide an improved method of and apparatus for providing a point-to-point full-duplex simultaneous bi-directional operation for connecting physical layer side device and network layer side device, for example, connecting Ethernet Switches and a SDH/SONET network. The present invention provides a novel way to communication between a telecom SDH/SONET transmission device and a remote access datacom device by adapting MAC frame directly to SDH/SONET.

To achieve the above and other objects, according to the first aspect, the present invention provides a data transmission apparatus for transmitting data packets from an upper layer side device to a lower layer side device, comprising: a first receiving means for receiving the data packets from said upper layer side device, and converting said data packets to a first type of frames; a first processing means for encapsulating said first type of frames to form a second type of frames containing a SAPI field including a SAPI identifier and an information field including said data packets; a second processing means for encapsulating said second type of frames into a payload portion, inserting appropriate overheads corresponding to said data packets, so as to form a third type of frames; and a first transmitting means for outputting said third type of frames to the lower layer side device.

Preferably, the first processing means encapsulates said first type of frames into a format of start flag, SAPI field including SAPI identifier as address field, control field, information field including said data packets, FCS field, and end flag, to form a second type of frames.

Alternatively, the first processing means preferably encapsulates said first type of frames into a format of start flag, address field, control field, SAPI field including said SAPI identifier, information field including said data packets, FCS field, and end flag, to form a second type of frames.

According to the second aspect of the invention, the present invention further provides a data transmission method for transmitting data packets from an upper layer side device to a lower layer side device, comprising steps of: receiving and buffering the data packets from said upper layer side device, adapting the rate of said upper layer side device to the rate of said lower layer side device, and converting said data packets to a first type of frames; encapsulating said first type of frames to form a second type of frames containing a SAPI field including a SAPI identifier and an information field including said data packets; encapsulating said second type of frames into a payload portion, inserting appropriate overheads corresponding to said data packets, so as to form a third type of frames; and outputting said third type of frames of the lower layer side device.

Preferably, the first type of frames are encapsulated into a format of start flag, SAPI field including SAPI identifier as address field, control field, information field including the data packets, FCS field, and end flag, to form a second type of frames.

Further, preferably said first type of frames are encapsulated into a format of start flag, address field, control field, SAPI field including said SAPI identifier, information field including said data packets, FCS field, and end flag, to form a second type of frames.

According to the third aspect of the invention, the present invention further provides a data transmission apparatus for transmitting data packets formed by a first type of frames from a lower layer side device to an upper layer side device, said apparatus comprising: a second receiving means for receiving the data packets from said lower layer side device; a de-framing means for removing the overheads of said first type of frames; a third processing means for extracting a SAPI field and the data contained in the information field from the payload portion of said first type of frames, to form a second type of frames; a determining means for comparing the value of the SAPI field with a preset value, and determining to output the extracted data as it be if the value of the SAPI field data equals to said preset value; a fourth processing means for converting said second type of frames to a third type of frames corresponding to in said data packets; and a second transmitting means for transmitting the extracted data packets to said upper layer side device.

Preferably, each of the second type of frames including start flag, SAPI field, control field, information field, FCS field, and end flag.

Further, preferably each of the second type of frames includes start flag, address field, control field, SAPI field including a SAPI identifier, information field including said data packets, FCS field, and end flag.

According to the fourth aspect of the invention, the present invention further provides a data transmission method for transmitting data packets formed by a first type of frames from a lower layer side device to an upper layer side device, said apparatus comprising steps of: receiving the data packets from said lower layer side device; removing the overheads of said first type of frames; extracting a SAPI field and the data contained in the information field from the payload portion of said first type of frames, to form a second type of frames; comparing the value of the SAPI field with a preset value, and determining to output the extracted data as it be if the value of the SAPI field data equals to said preset value; converting said second type of frames to a third type of frames corresponding to in said data packets; and transmitting the extracted data packets to said upper layer side device.

Preferably, each of the second type of frames including start flag, SAPI field, control field, information field, FCS field, and end flag.

Further, preferably each of the second type of frames includes start flag, address field, control field, SAPI field including a SAPI identifier, information field including said data packets, FCS field, and end flag.

According to the fifth aspect of the invention, the present invention further provides a data interfacing apparatus for transmitting data packets between an upper layer side device and a lower layer side device comprising the data transmission apparatus according to the first aspect and the data transmission apparatus according to the third aspect.

Other aspects and advantages of the invention will become apparent from the following detailed description taken in conjunction with the accompanying drawings, which illustrate, by way of example, the principles and implementation of the invention.

BRIEF DESCRIPTION OF THE DRAWINGS

The present invention will be readily understood by the following detailed description in conjunction with the accompanying drawings, in which.

DETAILED DESCRIPTION OF THE PREFERRED EMBODIMENTS

A preferred embodiment of the present invention will be described herein below with reference to the accompanying drawings. In the following description, well-known functions or construction are not described in detail since they would obscure the invention in unnecessary detail.

The invention is directed to adapting Ethernet to SDH/SONET or simplified SDH/SONET network. Connecting Ethernet Switches to a SDH/SONET network is a very attractive way to provide Ethernet over a Wide Area Network. It is transparent to the Ethernet switch that one or more Ethernet switch ports are connected.

For clarity, herein below gives some abbreviations used in the specification and figures.

| | |
|---|---|
| AUI | Attachment Unit Interface |
| FCS | Frame Check Sequence |
| GMII | Gigabit Media Independent Interface |
| IPX | Internet Packet Exchange |
| LAPS | Link Access Procedure-SDH |
| LAN | Local area network |
| LLC | Logical link control |
| MAC | Media access control |
| MAU | Medium Attachment Unit |
| MDI | Medium Independent Interface |
| MII | Media Independent Interface |
| SDH | Synchronous Digital Hierarchy |
| STM | Synchronous Transfer Module |
| sSTM | Sub-STM |
| VC | Virtual Container |
| SAPI | Service Access Point Identifier |
| PLS | Physical Layer Signalling |
| PCS | Physical Coding sublayer |
| PMA | Physical Medium Attachment |
| PHY | Physical Layer Device |
| PMD | Physical Medium Dependent |
| UITS | Unack. Information Transfer Service |
| HDLC | High Level Data Link Control |
| SPE | Synchronous Payload Envelope |
| TCP | Transmission Control Protocol |
| UDP | User Datagram Protocol |

Figure 1:
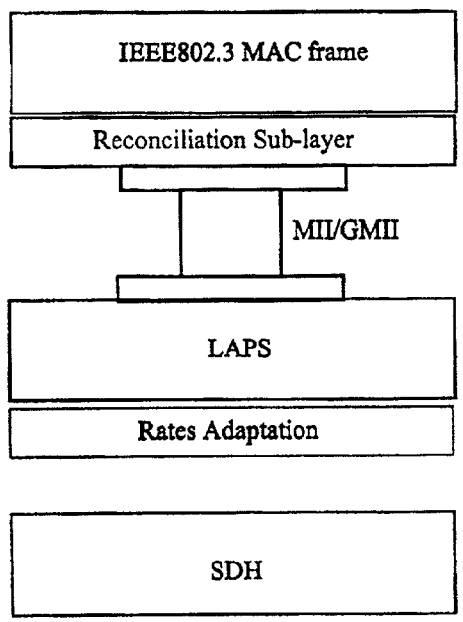
FIG. 1 is a schematic diagram showing a general scheme of Ethernet over LAPS of the invention which provides a point-to-point full-duplex simultaneous bi-directional operation, in terms of the relationship between Ethernet frame and LAPS and SDH.

FIG. 1 is a schematic diagram showing a general scheme of Ethernet over LAPS of the invention which provides a point-to-point full-duplex simultaneous bi-directional operation, in terms of the relationship between Ethernet frame and LAPS and SDH.

As shown in FIG. 1, LAPS is used between IEEE802.3 (802.3u/802.3z representing Ethernet/fast Ethernet/Gigabit Ethernet, respectively) link layer and MAC sublayer. The physical layer is defined as SDH which includes various high and low order VCs, the second layer is the combination of three elements: LLC/MAC/LAPS. LAPS is a type of HDLC, including data link service and protocol specification which have been used to IP over SDH using LAPS.

In this architecture, there is only one access point with which the LAPS link layer provide to MAC sublayer, for use with MAC frame of Ethernet/fast Ethernet/Gigabit Ethernet. The SAPI is "28(decimal)"for example. On the whole MAC frames of the MAC sublayer, parameters which are primitives are mapped to LAPS link layer while being transmitted. On the LAPS sublayer, the mapped MAC frames are treated as information fields of LAPS (which comprises destination address, source address, length/type, MAC client data, PAD field (if any) and FCS field of the intact MAC frame) without changing their sizes and sequence. The LAPS link layer adapts UITS, and interacts with the SDH physical layer through corresponding service access point with primitives and parameters.

The LAPS is a physical coding sub-layer, which provides point-to-point transferring over SDH virtual containers and interface rates. The supported UITS is connectionless-mode service. The rates adaptation between LAPS and SDH is applied. It provides a mechanism that adjusts the rate of Ethernet MAC MII to SDH VC rate, and also prevents MAC frame going to SDH VC is written to the SDH overhead since SDH and MAC are operated in the way of period and burst respectively. On the other hand, the rates adaptation could be applied between LAPS sublayer and the reconciliation sublayer.

SDH transport is treated as an octet-oriented synchronous point-to-point fullduplex link. The SDH frame is an octet-oriented synchronous multiplex mapping structure which specifies a series of standard rates, formats and mapping method. Table 2 shows the bandwidth value of the VCs and Table 3 shows the STM interface rates which are currently specified. The use of control signals is not required. The self-synchronous scrambling/descrambling (xll+1) function is applied during insertion/extraction into/from the synchronous payload envelope.

TABLE 2

The bandwidth of the SDH Virtual Containers

| VC type | VC bandwidth (kbit/s) | VC payload (kbit/s) |
|---|---|---|
| VC-11 | 1 664 | 1 600 |
| VC-12 | 2 240 | 2 176 |
| VC-2 | 6 848 | 6 784 |
| VC-3 | 48 960 | 48 384 |
| VC-4 | 150 336 | 149 760 |
| VC-4-4c | 601 304 | 599 040 |
| VC-4-16c | 2 405 376 | 2 396 160 |
| VC-4-64c* | 9 621 504 | 9 584 640 |

TABLE 3

STM interface rates

| STM type | STM bit rate (kbit/s) |
|---|---|
| SSTM-11 | 2 880 |
| SSTM-12 | 5 184 |
| SSTM-14 | 9 792 |
| SSTM-18 | 19 792 |
| SSTM-116 | 37 444 |
| SSTM-21 | 7 488 |
| SSTM-22 | 14 400 |
| SSTM-24 | 28 224 |
| STM-0 | 51 840 |
| STM-1 | 155 052 |
| STM-4 | 622 080 |
| STM-16 | 2 488 320 |
| STM-64 | 9 953 280 |

Figure 2:
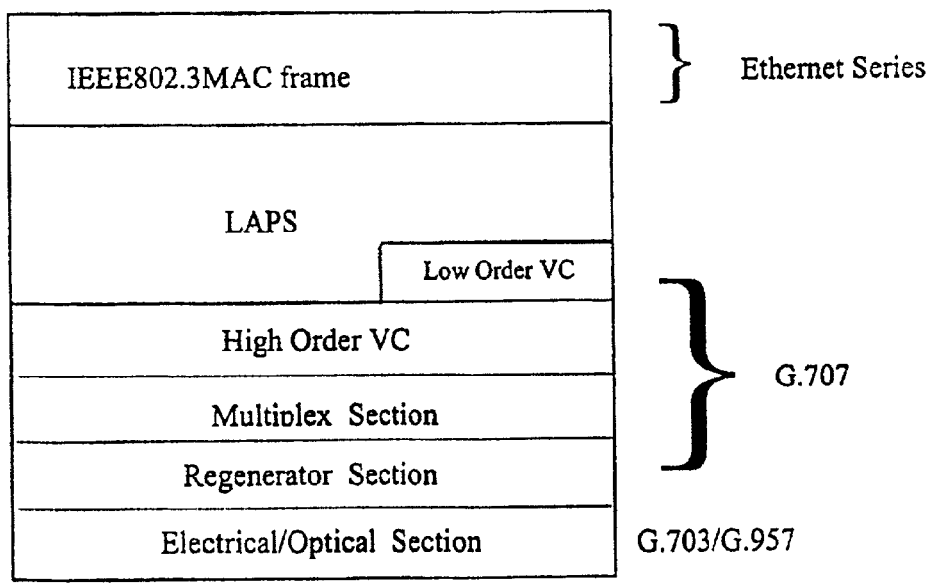
FIG. 2 shows layer/protocol stack for Ethernet over LAPS in STM-N.

The SONET transmission rates are integral multiples of STS-1 (51.840 Mbps). The allowed multiples are currently as follows:
STS-1: 51.840 Mbps
STS-3: 155.520 Mbps
STS-9: 466.560 Mbps
STS-12: 622.080 Mbps
STS-18: 933.120 Mbps
STS-24: 1244.160 Mbps
STS-36: 1866.240 Mbps
STS-48: 2488.320 Mbps
STS-192: 9 953 280 Mbps FIG. 2 shows layer/protocol stack for Ethernet over LAPS in STM-N.In FIG. 2, below the LAPS, there are two ways to place into VCs: (1) placing LAPS frames into low order VCs, multiplexing the low order VCs into high order VCs with octet interleaving based on multiplex structure of SDH, transmitting them in the sequence of multiplex section, regenerator section and Electrical/Optical/Radio section, and then extracting LAPS frames on a receiving side in a opposite sequence; (2) placing LAPS frames into SPEs which were mapped directly into high order VCs, transmitting them in the sequence of multiplex section, regenerator section and Electrical/Optical/Radio section, and then extracting LAPS frames on a receiving side in reverse sequence.

Figure 3:
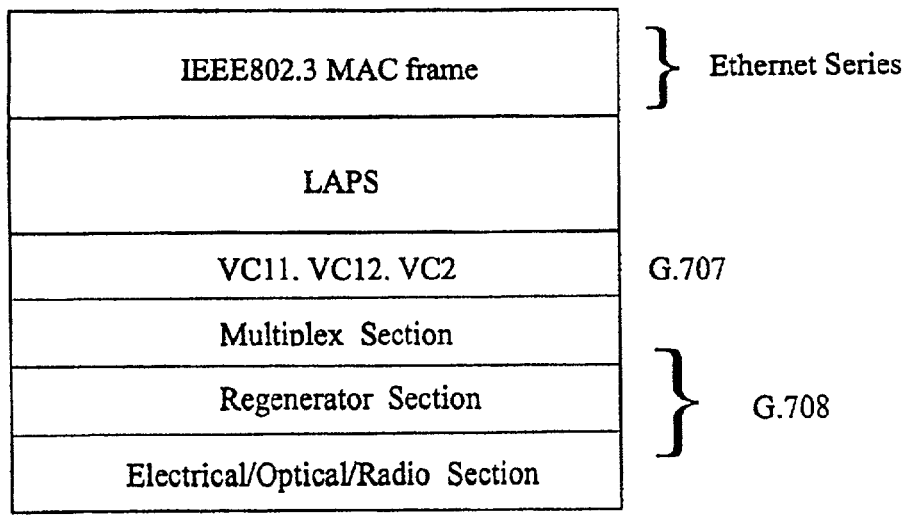
FIG. 3 illustrates layer/protocol stack for Ethernet over LAPS in sSTM.

FIG. 3 illustrates layer/protocol stack for Ethernet over LAPS in sSTM. The definition of this is to place LAPS frames into low order VCs (VC1, VC1, and VC2), multiplex the low order VCs into sub-multiplex section with octet interleaving based on sub-multiplex structure of SDH, then transmit them in a sequence of regenerator section and Electrical/Optical/Radio section, and then extracting LAPS frames on a receiving side in a opposite sequence.

Figure 4:
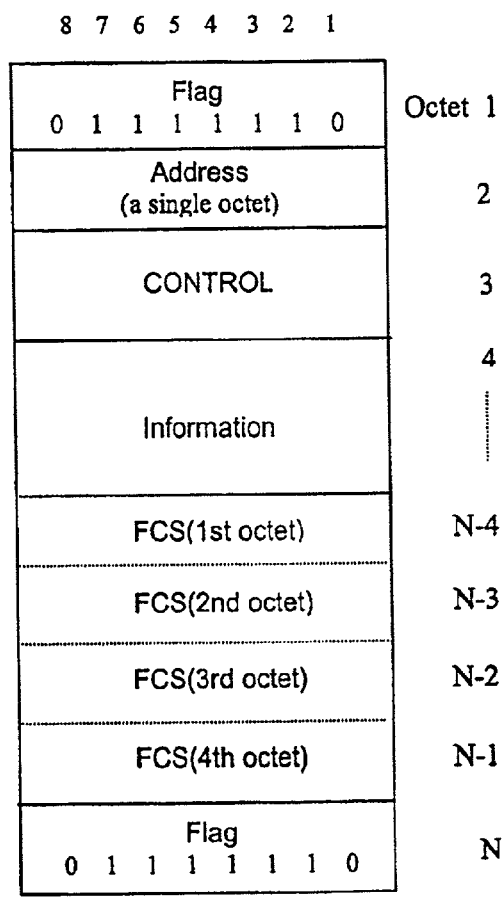
FIG. 4 illustrates the LAPS frame format according to a first embodiment of the present invention.

FIG. 4 illustrates the LAPS frame format according to a first embodiment of the present invention. As shown in FIG. 4, the LAPS encapsulation consists of the start Flag Sequence, address field (SAPI, Service Access Point Identifier)(one single octet), control field (0x03), Information field (Ipv4, Ipv6, or PPP protocol data unit), FCS (Frame check sequence) and the ending Flag Sequence. The Flag Sequence (0x7E) identifies the beginning/end of a LAPS frame.

Figure 17:
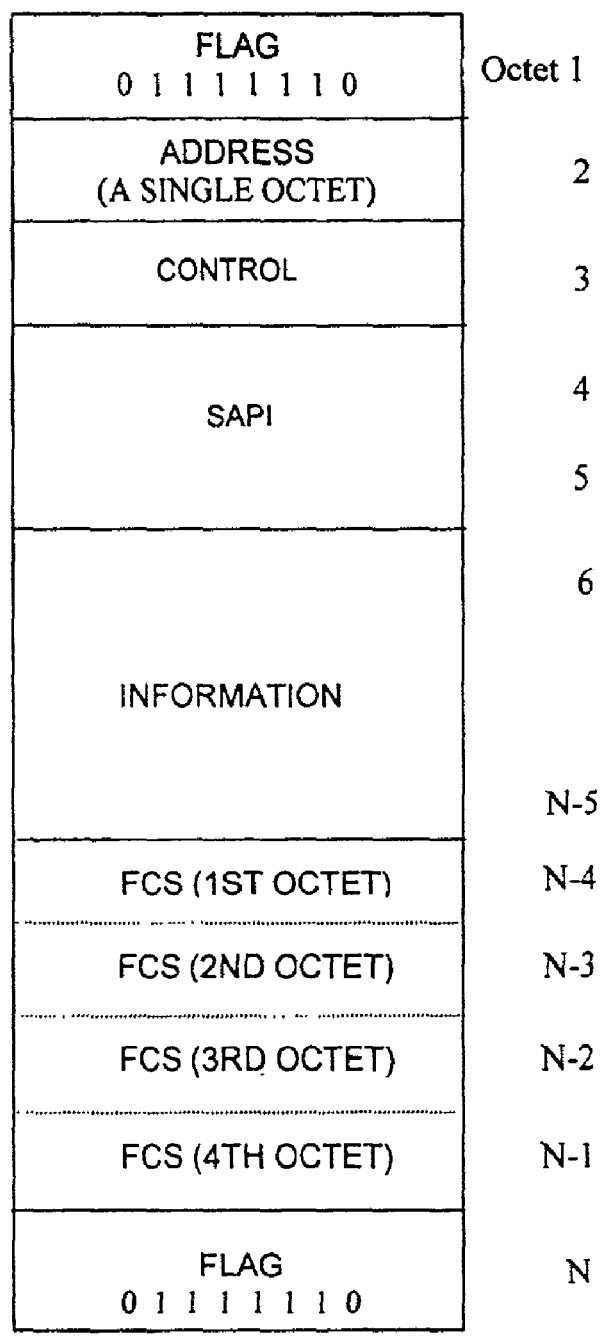
FIG. 17 illustrates the LAPS frame format according to a second embodiment of the present invention.

FIG. 17 illustrates the LAPS frame format according to the present invention. As shown in FIG. 17, the LAPS encapsulation consists of a start Flag Sequence, an address field (one single octet), a control field (0x03), a SAPI field (SAPI, Service Access Point Identifier, two octets), an Information field (Ipv4, Ipv6, or PPP protocol data unit), a FCS (Frame check sequence) and an ending Flag Sequence. The Flag Sequence (0x7E) identifies the beginning/end of a LAPS frame. Instead of placing the SAPI field in the address field as shown in FIG. 4, the format in FIG. 17 uses a separate SAPI field following the control field, and the address field will have its own usage as described below.

Figure 5:
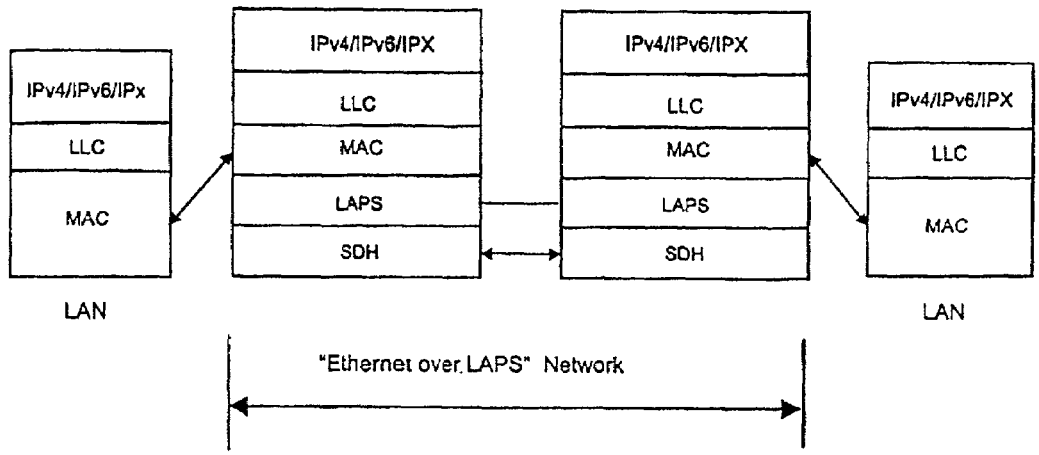
FIG. 5 illustrates an exemplary protocol configuration of Ethernet over LAPS.

FIG. 5 illustrates an exemplary protocol configuration of Ethernet over LAPS. In this case, an Ethernet interface accesses into an input/output gateway of another Ethernet interface through SDH. Two types of physical interface of SDH and MAC are provided at the gateway, and the network layer maintains unchanged as Ipv4/Ipv6/IPX.

Figure 6:
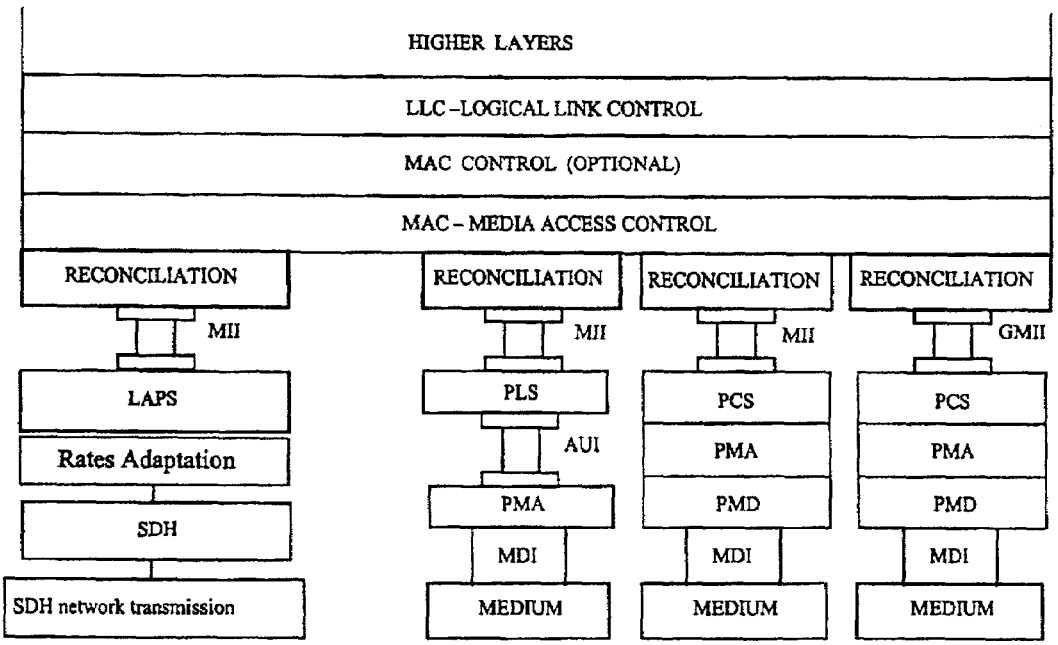
FIG. 6 illustrate the relationship between the Reconciliation sublayer/MII and LAPS/SDH on Ethernet over LAPS according to the invention.

FIG. 6 illustrate the relationship between the Reconciliation sublayer/MII and LAPS/SDH on Ethernet over LAPS according to the invention. In this case, three types of physical interfaces of Ethernet/Fast Ethernet/Gigabit Ethernet are provided below the MAC functional sublayer, and adaptation is implemented to the MAC sublayer and SDH physical layer through LAPS at the SDH side.

LAPS link entity accepts frames from the MAC layer through the Reconciliation sub-layer and an equivalent MII(Media Independent Interface). No address filtering function is used here. The FCS computations of LAPS and MAC refer to ITU-T Recommendation X.85/Y.1321 and IEEE 802.3 standard respectively. The function unit of Ethernet over LAPS forwards all incoming LAPS information field to its peer connected link except the originating link port, and is permitted to buffer one or more incoming frames before forwarding them.

Figure 7:
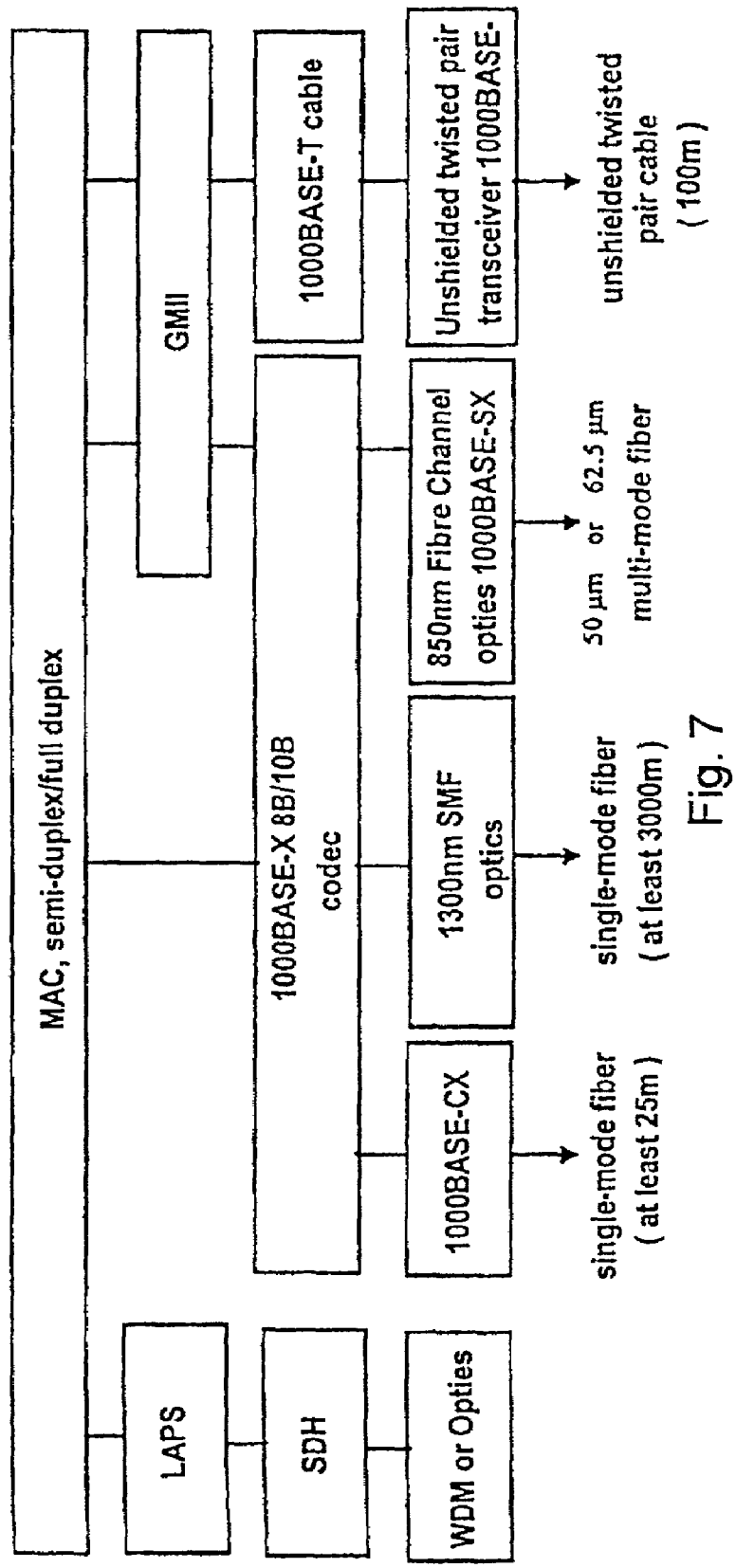
FIG. 7 illustrates a exemplary configuration of functional elements for implementing adaptation of Gigabit Ethernet to SDH according to an embodiment of the invention.

FIG. 7 illustrates a exemplary configuration of functional elements for implementing adaptation of Gigabit Ethernet to SDH according to an embodiment of the invention. As shown in the figure, the full-duplex is used only. Here the functional elements of IEEE 802.3 Ethernet, along with LAPS/SDH are illustrated. At the SDH side, adaptation is implemented to MAC sublayer and SDH physical layer, and Gigabit Ethernet is provided with double cable or four cable interface, single-mode fiber interface, multi-mode fiber interface and unshielded twisted pair interface.

Figure 8:
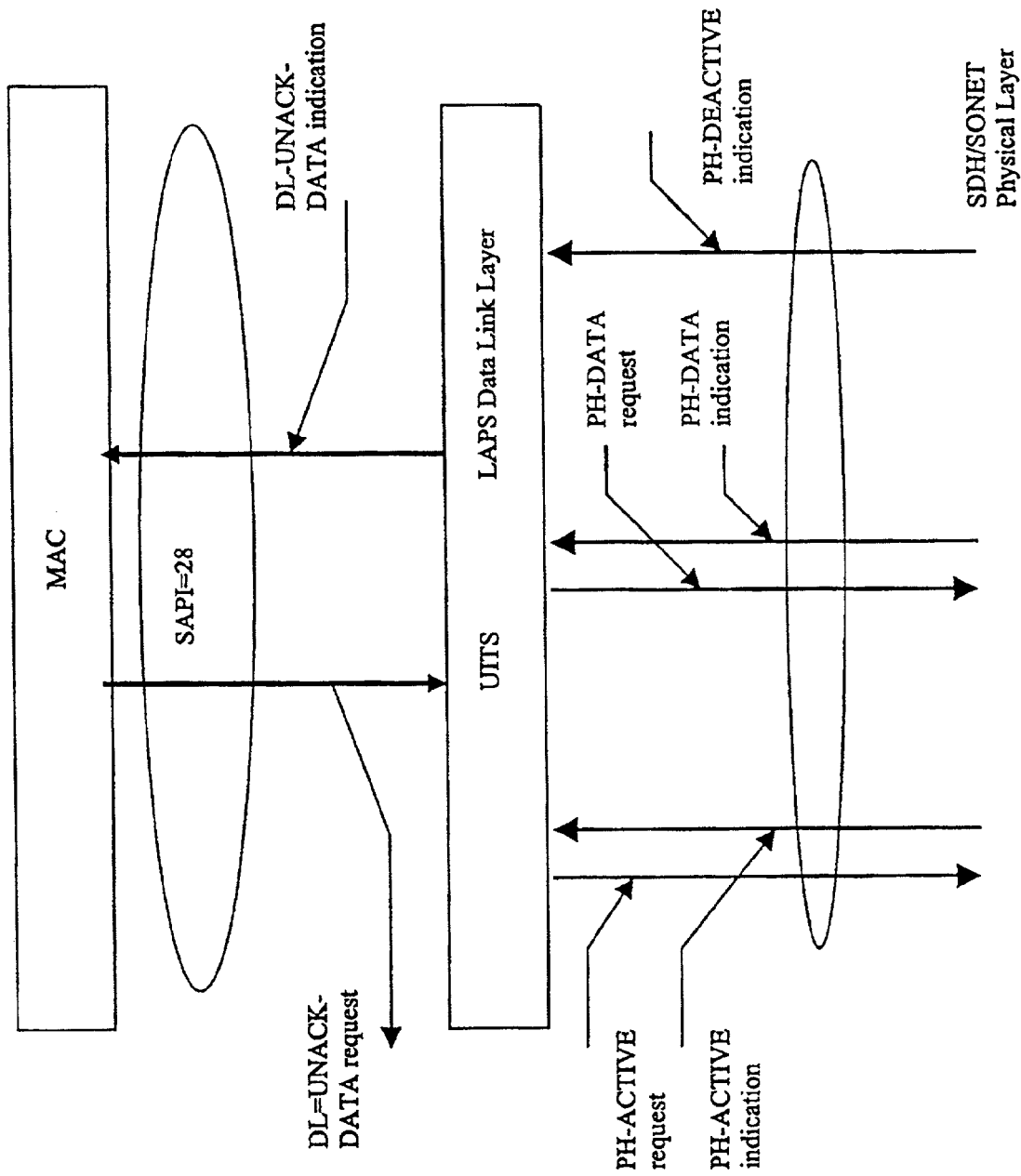
FIG. 8 shows the primitive relationship among MAC, LAPS link layer and physical layer.

FIG. 8 shows the primitive relationship among MAC, LAPS link layer and physical layer. In this case, LAPS provides a SAP, the SAPI of 28(decimal)" is used with Ethernet/Fast Ethernet/Gigabit Ethernet. The primitive "DL-UNACK-ACK request" is used when sending MAC frames from MAC sublayer to LAPS link layer, and the primitive "DL-UNACK-DATA indication" is used when receiving data packets from LAPS link layer to MAC sublayer. Between LAPS link layer and physical layer, the primitive "PH-DATA request" is used when establishing a link from LAPS to physical layer, and the primitive "PH-DATA indication" represents sending a command from the physical layer to LAPS link layer for establishing a link; the primitive "PH-DATA request" is used when sending data packet from LAPS link layer to physical layer, and the "PH-DATA indication" is used when receiving data packet from the physical layer to LAPS link layer.

Figure 9:
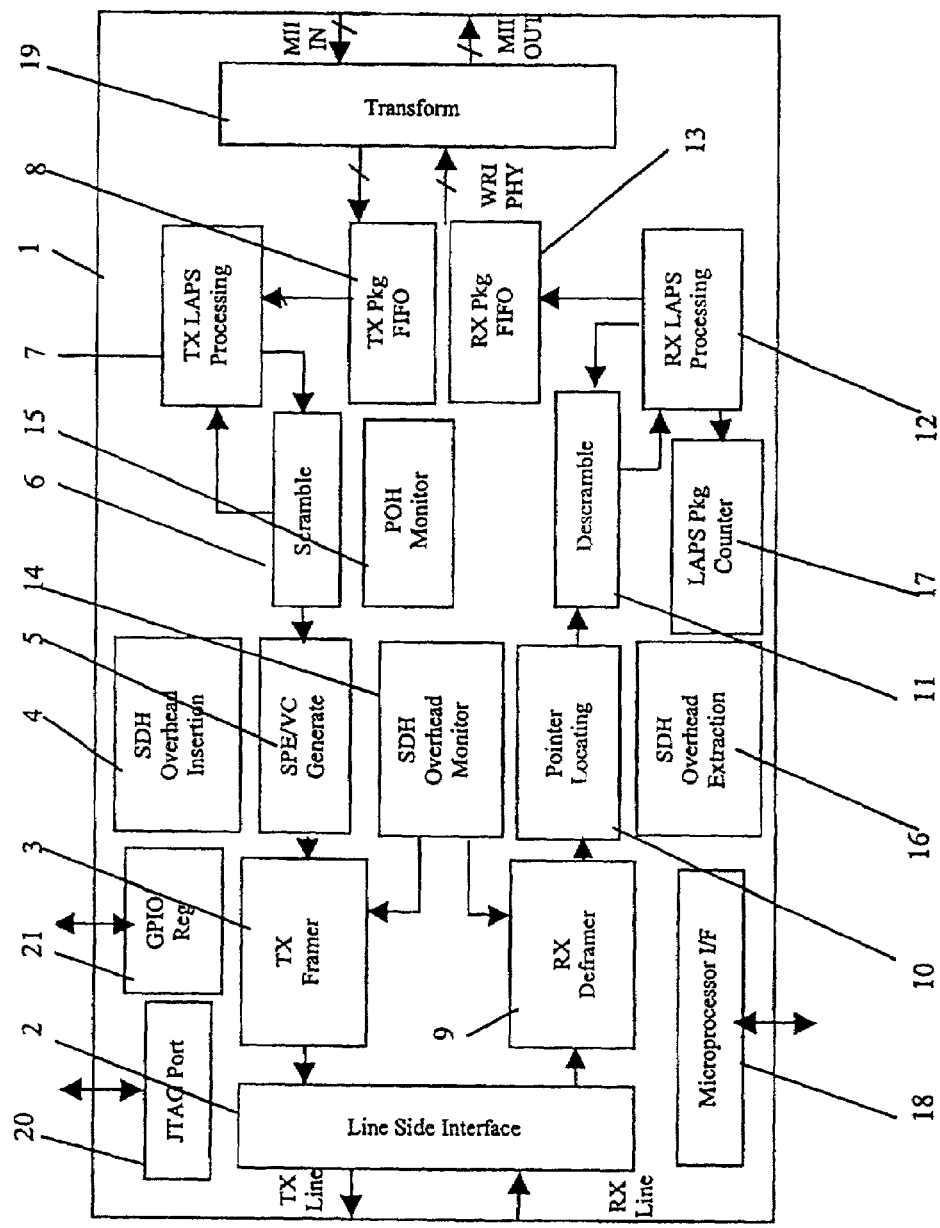
FIG. 9 is a block diagram illustrating an interfacing apparatus of Ethernet over SDH/SONET for adapting MAC frame directly to SDH/SONET or simplified SDH/SONET according to an embodiment of the invention.

Referring to FIG. 9, shown is a block diagram illustrating an interfacing apparatus of Ethernet over SDH/SONET for adapting MAC frame directly to SDH/SONET or simplified SDH/SONET according to an embodiment of the invention. The interfacing apparatus of Ethernet over SDH/SONET of the invention (herein below referred to EOS apparatus) could be built in telecom SDH/SONET transmission device to provide a Ethernet Interface, or built in remote access datacom device to provide 155M, 622M, 25G or 10G Ethernet interface, or even connected between telecom SDH/SONET transmission device and remote access datacom device to adapt MAC frame directly to SDH/SONET.

The EOS apparatus performs standard STS-3c/STM-1 processing for both the transmit and receive directions.

In the transmit direction, the rates of Ethernet are adapted to the rates of SDH/SONET, the MII frames are converted into LAPS frames, and the LAPS frames are encapsulated into the SDH/SONET SPE/VC. The POH and TOH/SOH are inserted, and the resulting STS signal is transmitted in octet wide to a parallel/serial converter, and then to Fiber Optic transceiver through a line side interface. According to the first embodiment of the present invention, i.e. in the case of the LAPS format of the FIG. 4, the LAPS frames are encapsulated into frames in the format as descibed in the FIG. 11; and according to the second embodiment of the present invention, i.e. in the case of the LAPS format of the FIG. 17, the LAPS frames are encapsulated into frames in the format of FIG. 18.

As shown in FIG. 9, in the transmit direction, the EOS apparatus 1 comprises: a TX FIFO 8 for receiving and buffer for receiving and buffering data packets from a Ethernet side device (e.g. IP packets in conformity with Ipv4 or Ipv6, or PPP packets, MPEG packets, voice packets, or other), and adapting the rate of MII to that of LAPS, for example adapting parallel burst 100M MII frames to periodic 155M LAPS frames; TX LAPS processing unit 7 for encapsulating the SAPI and data packets into LAPS frames, either according to the format shown in FIG. 4 or according to the format shown in FIG. 17; a scrambling unit 6 for scrambling the LAPS frames; a SPE/VC generating unit 5 for generating pointer which indicating the location of the SPE/VC; a SDH overhead insertion unit 4 for inserting overheads; and a TX SDH/SONET framer 3 for encapsulating the scrambled LAPS frames into SPE/VC of SDH/SONET frames to form SDH/SONET frames.

In the receive direction, the process is reversed. The octet wide STS signal is received, the interfacing apparatus of Ethernet over SDH/SONET locates the frame and TOH/SOH, interprets the pointer, terminates the TOH/SOH and POH, extracts the SPE/VC4, and then extracts the LAPS frames from the SPE/VC4 payload. The SONET/SDH processor consists of a Receive SONET/SDH Processor and a Transmit SONET/SDH processor.

As shown in FIG. 9, in the receiving direction, the EOS apparatus 1 comprises: a RX de-framer 9 for de-framing received SDH/SONET frames; a SDH overhead extraction unit 16 for remove the overhead of SDH/SONET frames; a pointer processing unit 10 for locating and interpreting the pointer, extracting the SPE/VC4, and separating the LAPS frames from the SPE/VC4; a descrambling unit 11 for descrambling the extracted LAPS frames; a RX processing unit 12 for deframing the LAPS frames and extracting the SAPI and the data packets encapsulated in the LAPS frames either in the format of FIG. 4 or in the format of FIG. 17; and a RX FIFO 13 for buffering the data packets, determining the SAPI, adapting the rate of LAPS to that of MII, for example adapting periodic 155M LAPS frames to parallel burst 100M MII frames, and sending the data packets, e.g. IP packets, and SAPI value. The EOS apparatus 1 also includes: a SDH overhead monitoring unit 14 for monitoring TOH/SOH bytes for errors of changes in states, and a POH monitoring unit 15 for monitoring the POH for errors of changes in states.

A determining unit (not shown) is provided in the RX processing unit 12 for determining the type of the received data packets, generating a corresponding predetermining SAPI, and check errors occurred in the frames.

In addition, the EOS apparatus 1 further comprises: a transformer 19 for synchronizing the data packets of upper layer side device with data packets input to first receiving means in the transmission direction, and for synchronizing the extracted data packets from second transmitting means with the data packets of upper layer side device in the receiving direction.; a line side interface 2 for transmitting SDH/SONET frames via TX lines to peripheral SDH/SONET supporting device, such as O/E module (not shown), and receiving SDH/SONET frames via RX lines; a microprocessor I/F 18 for enabling the EOS apparatus 1 to access all registers within it; a JTAG port 20 for testing; and a GPIO register 21 for temporal buffering input/output packets.

The main functions of the EOS apparatus are as follows:
Handle the source and sink of SONET/SDH section, line, and path layers, with transport/section E1, E2, F1 and D1–D1 overhead interfaces in both transmit and receive directions.
Implement the Processing of STS-48c/STM-16 or STS-12c/STM-4 or STS-3c/STM-1 data streams with full duplex mapping of LAPS frame into SONET/SDH or simplified SONET/SDH payloads.
Self-synchronous scrambler/Descrambler implementing ($X^{43}$+1) polynomial for LAPS.
Provides an MII interface.
Supplies 8-bit or16-bit microprocessor interface used into control, configuration, and status monitoring.
LAPS processing compliant with ITU-T Recommendation X.86.

Compliant with SONET/SDH specifications ANSI T1.105, Bellcore GR-253-CORE and ITU G.707.

Provides IEEE 1149.1 JTAG test port.

Supports internal loopback paths for diagnostics.

Provides an 8-bit general purpose I/O (GPIO) register.

Herein below is a detailed description related the receive and transmit processing of the interfacing apparatus of the invention. In the description hereinafter, the related functions or operations and the functional blocks or units can be implemented in form of a executable program and/or hardware designs, which will be omitted for avoiding unnecessary obscuring the main aspects of the present invention.

Receive SONET/SDH Processing

The RX de-framer 9 is implemented as a receive SONET/SDH Processor. The receive SONET/SDH Processor provides for the framing of the STS signal, descrambling, TOH/SOH monitoring including B1 and B2 monitoring, AIS detection, pointer processing, and POH monitoring. The Receive SONET/SDH Processor performs the following functions:

SONET/SDH framing, [A1 A1 A2 A2] bytes are detected and used for framing. Provides OOF and LOF indicators (single event and second event).

Descrambling of payload using SONET/SDH frame synchronous scrambler, polynomial ($X^7+X^6+1$).

Monitors incoming B1 bytes and compares them to recalculated BIP-8 values. Provides error event information, including counts of individual bit errors, errored frames, and errored seconds.

Monitors incoming B2 bytes and compares them to recalculated BIP-96/24 values. Provides error event information, including counts of individual bit errors, errored frames, and errored seconds.

Monitors K1 and K2 bytes, which are used for sending Line/MS AIS or RDI, and for APS signaling.

Monitors the 4 LSBs of received S1 bytes for consistent values in consecutive frames.

Monitors the M1 byte for determining the number of B2 errors that are detected by the remote terminal in its received signal.

The TOH/SOH drop block outputs the received E1, F1, and E2 bytes and 2 serial DCC channels, SDCC (D1–D3) and LDCC (D4–D1).

Pointer state determination involves examining the H1–H2 bytes to establish the state of the received pointer (Normal, LOP, AIS). If the pointer state is normal, the first H1H2 bytes are read to determine the start of the SPE/VC.

The POH monitoring block consists of J1, B3, C2, and G1 monitoring. These POH bytes are monitored for errors or changes in states.

Monitors/Captures J1 bytes. In SONET applications, captures 64 consecutive J1 bytes and in SDH applications the EOS apparatus looks for repeating 16 consecutive J1 byte patterns.

Monitors C2 bytes for verification of correct tributary types. The tributary is checked for 5 consecutive frames with identical C2 byte values.

Monitors G1 for REI-P and RDI-P.

Monitors incoming B3 bytes and compares them to recalculated BIP-8 values. Provides error event information, including counts of individual bit errors, errored frames, and errored seconds.

For the purpose of determining whether or not the bit error rate of the received signal is above or below two different provisionable thresholds, the EOS apparatus provides two B2 error rate threshold blocks. The Signal Fail (SF) and the Signal Degrade (SD) conditions are reported when thresholds are exceeded via interrupts.

Transmit SONET/SDH Processing

The TX framer 3 is implemented as a transmit SONET/SDH processor. The Transmit SONET/SDH Processor provides for the encapsulation of the LAPS frames into the SPE/VC. It then inserts the appropriate POH and TOH/SOH and outputs the final STS signal to a parallel to serial converter followed by a Fiber Optic transceiver.

The Synchronous Payload Envelope /Virtual Container (SPE/VC) Generation block multiplexes LAPS frames from the system interface with Path Overhead (POH) bytes that it generates to create the SPE for SONET or VC for SDH.

Supports the following POH bytes: Path Trace (J1), Path BIP-8 (B3), Signal Label (C2), Path Status (G1). Other POH bytes are transmitted as fixed all-zeros.

Performs AIS and Unequipped signal insertion.

TOH/SOH generation, including: Frame bytes A1A2—Fixed F6 or forced errors through Microprocessor Interface for test purposes.

Section Trace (J0)—Programmable through Microprocessor Interface

Section Growth (Z0)—Fixed pattern 2–12

Section BIP-8 (B1)—Calculated or forced errors through Microprocessor Interface for test purposes.

Orderwire (E1E2)—External Serial Interface

Section User Channel (F1)—External Serial Interface

Data Communications Channel (D1–D1)—External Serial Interface

Pointer Bytes (H1H2H3)—Fixed 522, NDF disabled, SS programmable

Line BIP-96/24 (B2)—Calculated or forced errors through Microprocessor Interface for test purposes.

APS/MS AIS (K1K2)—Programmable through Microprocessor Interface Synchronization Status (S1)—Programmable through Microprocessor Interface Line/MS REI (M1)—Calculated or forced errors through Microprocessor Interface for test purposes Undefined TOH/SOH transmitted as fixed all-zeros. Scrambling of payload using SONET/SDH frame synchronous scrambler, polynomial ($X^7+X^6+1$).

Below describes the LAPS processing in detail.

LAPS Processing

The EOS apparatus 1 extracts frames/packets from the SONET Payload Envelope (SPE). Frames/packets are extracted via a LAPS processor. The EOS apparatus 1 also supports a flow-thru mode that allows the SPE to pass directly to the System Interface. The LAPS processor performs LAPS like framing for LLC and other packet based data. The LAPS processor is a single channel engine that is used to encapsulate packets into an LAPS frame as per ITU-T Recommendation X.86. The LAPS processor operates on byte aligned data only (e.g. the message is an integer number of bytes in length). In EOS mode, the LAPS processor is broken up into a Receive LAPS Processor and a Transmit LAPS Processor.

Encapsulation

LAPS link entity accepts frames from the MAC layer through the Reconciliation sub-layer and an equivalent MII(Media Independent Interface). No address filtering function is used here.

Figure 10:
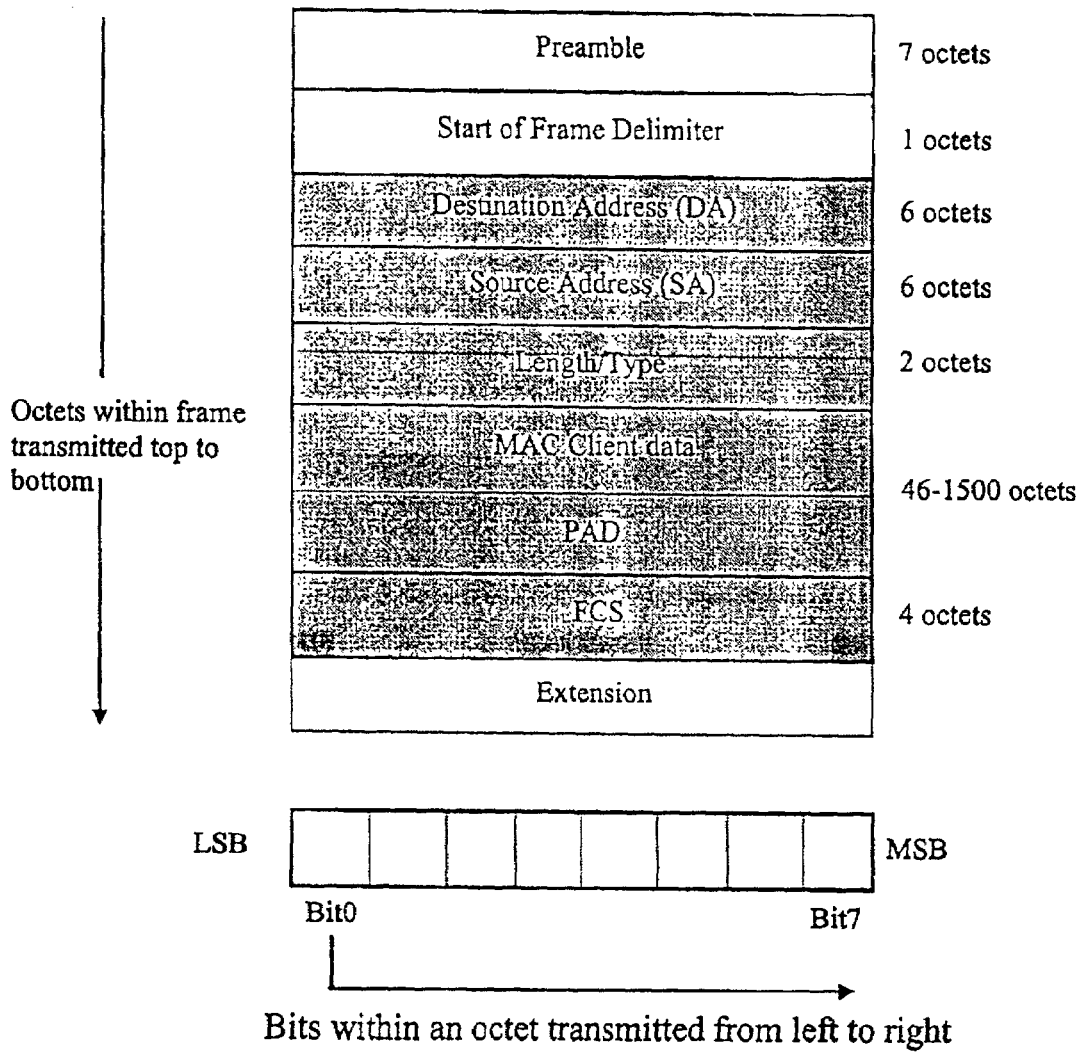
FIG. 10 is a schematic diagram showing the format of IEEE 802.3 Ethernet MAC frame, wherein the format of LAPS information field are defined in the shaded region.
Figure 11:
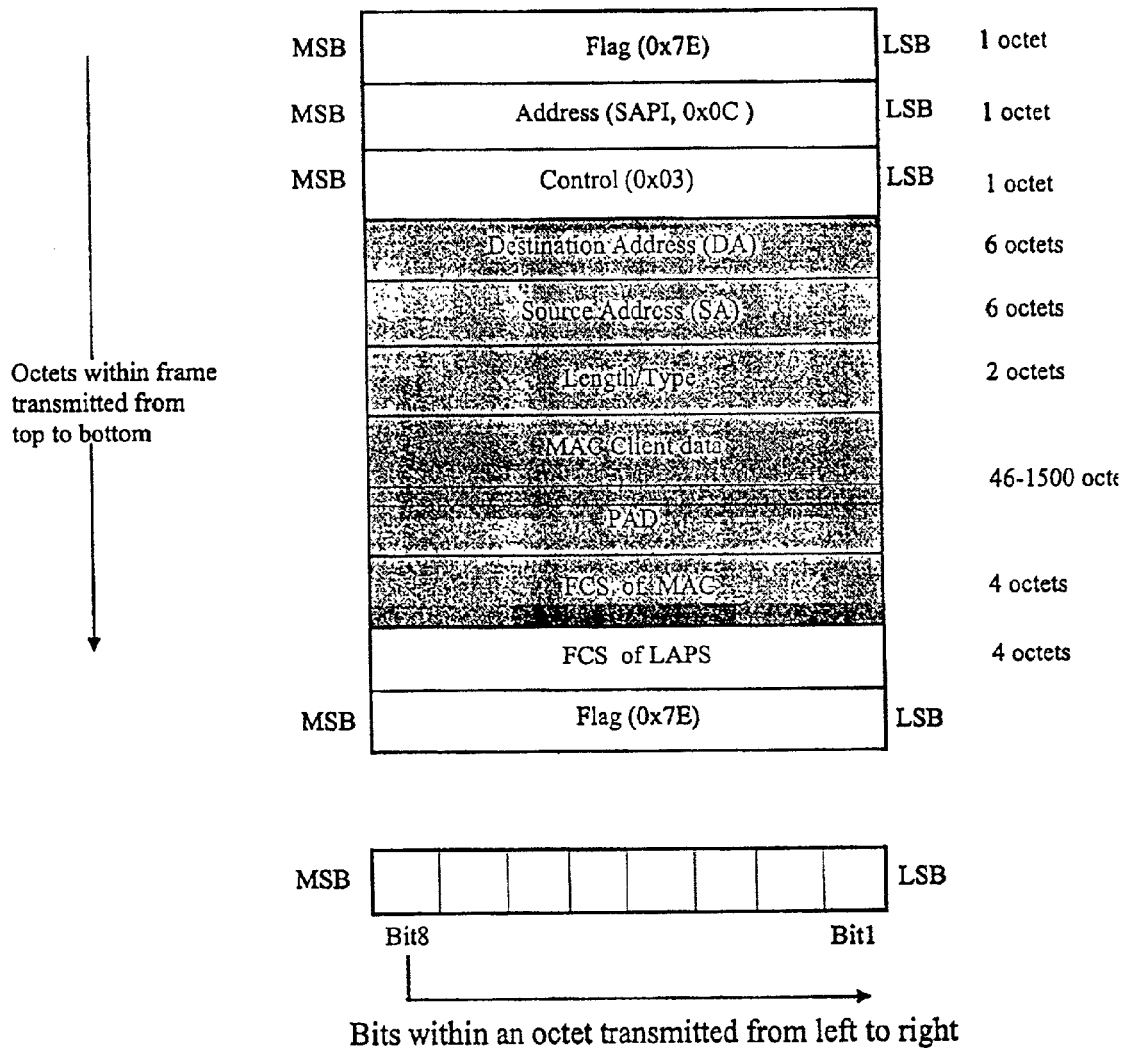
FIG. 11 presents the format of LAPS frame after encapsulating MAC field according to the first embodiment of the present invention.
Figure 18:
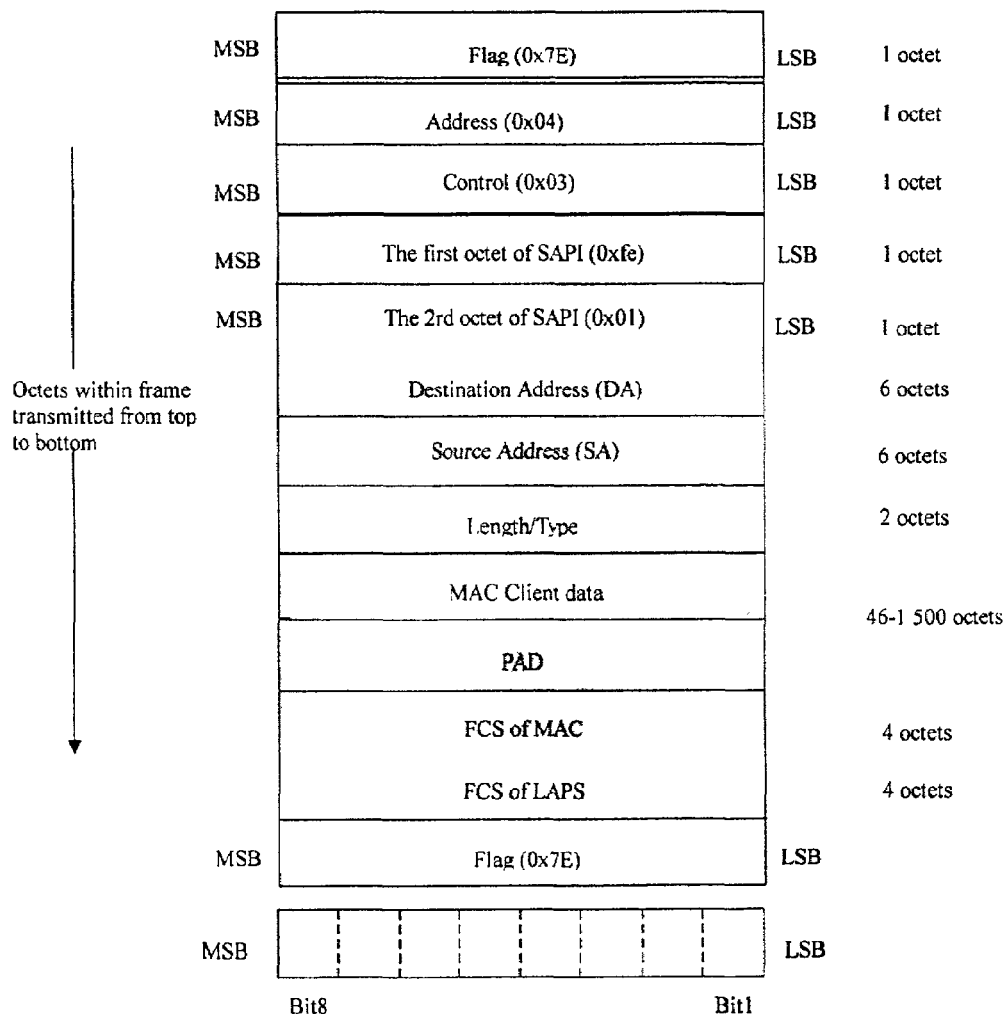
FIG. 18 presents the format of LAPS frame after encapsulating MAC field according to the second embodiment of the present invention.

FIG. 10 is a schematic diagram showing the format of IEEE 802.3 Ethernet MAC frame, wherein the format of LAPS information field are defined in the shaded region. FIG. 11 presents the format of LAPS frame after encapsulating MAC field according to the first embodiment of the invention, and FIG. 18 shows the format of LAPS frame after encapsulating MAC field according to the second embodiment of the invention. The FCS computations of LAPS and MAC refer to ITU-T Recommendation X.85/ Y.1321 and IEEE 802.3 standard respectively. The function unit of Ethernet over LAPS forwards all incoming LAPS information field to its peer connected link except the originating link port, and is permitted to buffer one or more incoming frames before forwarding them. FIG. 6 shows the relationship between the Reconciliation sub-layer/MII and LAPS/SDH.

Receive LAPS Processor

The Receive LAPS Processor 12 provides for the extraction of LAPS frames, transparency removal, FCS error checking, de-scrambling of the SPC/VC payload, optional deletion of the control and address fields, and performance monitoring.

After the start/end of field flags and byte stuffing are removed the remaining payload includes the data and the FCS field. See figure below for details. Note, only one flag byte is required between two packets. All flags between packets are discarded.

The Receive LAPS Processor 12 performs the following functions:

- Optionally self synchronous de-scrambles (X 43+1 polynomial) received payload.
- Detects and terminates the LAPS frame, e.g. frame delimiting flag detection.
- Removes Control Escape stuffing
- Calculates optional FCS code (32 bit) and compares it against the received FCS value. Errors are accumulated in Performance Monitor Registers. Outgoing data is marked as errored if FCS error is detected.
- Detects abort sequence in (0x7D, 0x7E) in byte stream.
- Optionally deletes Address and Control fields.
- Provides optional minimum and maximum packet length detection (SW configurable) and asserts RX_ERR signal with data to mark errored condition.
- Generates Performance Monitoring for octets: FCS Errors, Aborted packets, Short Packets, Long Packets, Packets discarded due to RXFIFO error.
- Optionally deletes packet stuffing used to handle far end FIFO underflow conditions.
- Generates interrupt on error conditions.
- Automatically deletes inter-packet gap of flags.
- If enabled, for the purpose of rate adaptation, remove the programmable Inter-Frame Gap fill byte (0x7E).
- Synchronize the LAPS information field (MAC/GMAC frame) from SDH/SONET block to-RX_CLK at MII/ GMII interface through transformer 19.

LAPS Frame Synchronization

The Flag Sequence (0x7E) identifies the beginning/end of a LAPS frame. The received SPE payload data is searched octet-by-octet for the Flag Sequence in order to locate the LAPS frame boundaries. The octet value used to identify the Flag Sequence shall be programmable and defaults to 0x7E.

Two consecutive Flag Sequences constitute an empty frame that is simply ignored. N consecutive Flag Sequences are therefore counted as N−1 empty frames. Frames which are too short, Invalid Frames, are silently discarded. Frames are considered invalid if a LAPS frame a) is not properly bounded by two flags; or
b) has fewer than six octets between flags of frames; or
c) contains a frame check sequence error; or
d) contains a service access point identifier which is mismatched with "4" (Ipv4-based service), "6" (Ipv6-based service) "255" (PPP-based service) or not supported by the receiver; or
e) contains an unrecognized Control field value; or
f) ends with a sequence of more than six "1" bits.

LAPS Octet De-stuffing Processing

The LAPS octet de-stuffing procedure (also sometimes referred to as escaping transform), is applied on the received LAPS frames before FCS calculation and after LAPS frame synchronization. Octet de-stuffing is done by the examination of the entire LAPS frame between the start and ending Flag Sequences for the control escape octet. When found, the control escape octet is removed from the octet stream, and the following octet is applied to exclusive-or'd operation with an octet de-stuffing masking octet. The abort sequence shall not be considered an escape sequence.

The control escape octet value shall be programmable and defaults to 0x7D. The octet de-stuffing masking octet shall be programmable and defaults to 0x20. As an example, 0x7E is encoded as 0x7D, 0x5E. 0x7D is encoded as 0x7D, 0x5D.

LAPS Abort Sequence

The Abort Sequence (Control Escape followed by Flag Sequence) may be optionally detected in the incoming LAPS frames. An Abort Sequence marks the end of an aborted LAPS frame.

Transmit LAPS Processor

The Transmit LAPS Processor 7 provides the insertion of packet-based information into the STS SPE. It provides packet encapsulation, FCS field generation, inter-packet fill, TXFIFO error recovery and scrambling. The Transmit LAPS Processor performs the following functions:

- Encapsulates packets within an LAPS frame. According to the first embodiment of the invention, each packet is encapsulated with a start flag (0x7E), an optional FCS field, optional Address and Control fields, and an optional end of field flag (0x7E), as shown in FIG. 4, and according to the second embodiment of the invention, each packet is encapsulated with a start flag (0x7E), an optional FCS field, optional SAPI field, Address and Control fields, and an optional end of field flag (0x7E), as shown in FIG. 17
- Optional self synchronous transmit payload scrambler (X 43+1 polynomial).
- Transparency processing as required by ITU-T X.85 (octet stuffing for Flags & Control Escape). Byte stuffing occurs between start and end of field flags. Stuffing replaces any byte that matches the flag or the control escape bytes with a two byte sequence consisting of the Control Escape followed by the original byte exclusive-ored with (0x20) HEX.
- Generates start and end of field flags (0x7E). Note a single flag can be shared between two packets.
- Optionally generates 32-bit CRC for Frame Check Sequence (FCS) field.
- Provides the ability to insert FCS errors for testing under SW control.

TX_PRTY errors generate an interrupt.

Provides for a selectable treatment of FIFO underflow. A FIFO underflow condition occurs when a TXFIFO empty occurs prior to the end of a packet. When this occurs an interrupt is generated. The packet can either be ended via generation of a FCS error, or an abort sequence, or "fill" bytes can be inserted during the gap via a SW configurable escape code.

Generates Performance Monitor counts that include: Number of FIFO error events, aborted packets, and number of packets that violate minimum and maximum packet length parameters (SW configurable).

Synchronize the received MAC/GMAC frame from MII/GMII to the SDH/SONET block clock through transformer 19.

If necessary, for the purpose of rate adaptation, add the programmable rate- Inter-Frame Gap fill byte (0x7E).

FCS Polynomials

The EOS apparatus 1 supports CRC-32 Frame Check Sequence (FCS) generation and checking.

The FCS is transmitted least significant octet first, which contains the coefficient of the highest term. The EOS apparatus can be provisioned to calculate the FCS either using little endian bit order as per LAPS or big endian bit order.

The following polynomials are used for the generation and checking of the FCS values CRC-32: $1x+x^2+x^4+x^5+x^7+x^8+x^{10}+x^{11}+x^{12}+x^{16}+x^{22}+x^{23}+x^{26}+x^{32}$. The FCS field is calculated over all bits of the Address (SAPI value), Control, Information fields, not including any octets inserted for transparency. This does not include the Flag Sequences nor the FCS field itself. With both FCS methods, the CRC generators and checkers are initialized to all Logic "ones". Upon completion of the FCS calculation the FCS value is ones-complemented. It is this new value that is inserted in the FCS field.

Now we will describe the processing of data in the transmit direction according to the invention in detail.

Processing of Data in the Transmit Direction

In the Transmit Direction, the EOS apparatus 1 provides for the insertion of packet based data into the STS/STM SPE. The operating mode of the device is provisionable through the management control interface. The register value TX_EOS=1 places the device in EOS mode.

Transmit FIFO Interface

In EOS mode, the Transmit System Interface operates as a MII compliant interface.

1. Transmit FIFO

In TX FIFO 13, burst type MII frames (e.g. 100M) received from transformer 19 are converted into periodic LAPS frames (e.g. 155M) by parallel processing, in the way of inserting a Flag of 0x7E or the way of synchronizing the receive and transmit sides of the TX FIFO.

The Transmit System Interface is controlled by the Link Layer device that precedes the EOS apparatus in the transmit direction of the transmission path. The Link Layer device provides an interface clock to the EOS apparatus for synchronizing all interface transfers. This convention requires the EOS apparatus 1 to incorporate a rate-matching buffer (i.e. a FIFO). The size of the FIFO is 512 octets as a minimum value. The EOS apparatus also transfers the packet status (start/end of packet/cell, whether the last word in the packet consists of one or two octets, packet error) through the FIFO.

2. Transmit FIFO Error

In EOS modes, the state of the FIFO is monitored by the EOS apparatus. A FIFO error condition is declared whenever 1) a MII_TX_SOP is received prior to the end of a packet (TX_EOP indication) or 2) the MII_TX_ENB is active beyond the "transmit window" following the deassertion of the TX_CLAV signal. FIFO error events are reported to the management interface by setting MII_TX_FIFOERR_E=1. The EOS apparatus contains an 8-bit FIFO error counter that counts every packet affected by a FIFO error event.

When the performance monitoring counters are latched, the value of this counter is latched to the MII_TX_FIFOERR_CNT[7:0] register, and the FIFO error counter is cleared. If there has been at least one FIFO error event since the last rising edge of LATCH_EVENT, then the FIFO error event bit, MII_TX_FIFOERR_SECE, is set. In EOS mode (MII_TX_EOS=1), the EOS apparatus aborts the errored packets.

3. EOS Errored Packet Handling

In EOS mode of operation, (MII_TX_EOS=1), the following errored packet handling procedures are provided:

4. TX_ERR Link Layer Indication

The Transmit System Interface provides a method by which the Link Layer device can indicate to the EOS apparatus when a particular packet contains errors and should be aborted or discarded (see definition of MII_TX_ERR.

The EOS apparatus 1 contains an 8-bit link layer error counter that counts every packet received from the Link Layer that is marked as errored. When the performance monitoring counters are latched (LATCH_EVENT transitions high), the value of this counter is latched to the MII_TX_EOS_LLPKT_ERRCNT[7:0] register, and the link layer packet error counter is cleared. If there has been at least one link layer packet error since the last rising edge of LATCH_EVENT, then the link layer packet error event bit, MII_TX_EOS_LLPKT_ERR_SECE, is set.

5. Minimum/Maximum Packet Sizes

The EOS apparatus also, as an option, views a packet as being errored and does not transmit it or aborts if it violates minimum or maximum packet sizes. The packet sizes refer to the size of the LAPS packet only, and do not include the bytes inserted by the EOS apparatus (flag sequence, address, control, SAPI; FIFO underflow, transparency or the FCS bytes). These minimum and maximum sizes are programmable via the management control interface. Register MII_TX_EOS_PMIN[3:0] contains the minimum packet size. The default value of this register is 6. Register MII_TX_EOS_PMAX[15:0] contains the maximum packet size. The default value of this register is 0x05E0.

The EOS apparatus 1 disables/enables minimum and maximum size packet checking when instructed to through the management interface. If MII_TX_EOS_PMIN_ENB or MII_TX_EOS_PMAX_ENB=1, packet abort due to a violation of the packet size restriction is enabled. If=0 (the default), packet size violations are ignored.

The EOS apparatus 1 contains two 8-bit error counters that count every violation of the maximum and minimum packet size limits. When the performance monitoring counters are latched, the value of these counters is latched to the MII_TX_EOS_PMIN_ERRCNT[7:0] and MII_TX_EOS_PMAX_ERRCNT[7:0] registers, and the packet size violation counters are cleared. If there has been at least one packet size violation error since the last rising edge of LATCH_EVENT, then the appropriate packet size violation second event bit, MII_TX_EOS_PMIN_ERR_SECE or MII_TX_EOS_PMAX_ERR_SECE, is set.

6. Errored Packet Abort

The EOS apparatus 1 cannot delete packets if the error condition is received or detected after transmission of the packet has begun. These packets are therefore aborted. The EOS apparatus supports two options for aborting an errored packet.

The default option is to abort a packet by inserting the abort sequence, 0x7d7e. Reception of this code at the far end will cause the receiver to discard this packet. As an alternative, the EOS apparatus can also abort an errored packet by simply inverting the FCS bytes. The abort mode is controlled via the management control interface. MII_TX_EOS_FCSABRT_ENB=1 enables the FCS inversion method, MII_TX_EOS_FCSABRT_ENB=0 (the default) disables it.

Line Side Packet Loopback

For testing purposes, the EOS apparatus 1 also provides the capability for the user to loopback the packets it extracts from the SONET/SDH signal into the transmit direction FIFO, where it replaces the data received from the System Interface. This data will then undergo the transmit side LAPS processing, and be sent back out the SONET/SDH line. When MII_R_TO_T_LOOP is set to 1, the loopback is activated. When MII_R_TO_T_LOOP is 0, the loopback is inhibited and normal processing proceeds. This loopback is provided primarily for device testing purposes. In actual operation, if the receive clock is faster than the transmit clock and the SONET/SDH payload is filled with packets, there could be periodic errors due to the inability of the transmit side to accommodate the full data rate of the receive side.

Transmit LAPS Processing

Following the Transmit System Interface, the EOS apparatus 1 performs the following processing when in EOS mode (MII_TX_EOS=1).

1. Encapsulation of Packets in LAPS Frame

The LAPS frame defined for EOS applications according to the first embodiment of the invention is illustrated in FIG. 4, and FIG. 17 illustrates the LAPS frame defined for EOS application according to the second embodiment. In EOS mode (MII_TX_EOS=1), each LAPS packet received from the Link Layer is delineated using the Flag Sequence defined in ITU-T X.85, which is used to indicate both the beginning and end of an LAPS frame. The value of this Flag Sequence is 01111110 (hexadecimal 0x7e).

As an option, the EOS apparatus may insert a single flag to indicate both the end of one frame and the start of the following frame. This is controlled via the management interface; if MII_TX_EOS_EOP_FLAG=1, the EOS apparatus inserts separate flags to indicate the start and end of frame. If MII_TX_EOS_EOP_FLAG=0 (the default), only a single Flag Sequence may be inserted.

In the special case when generation of the FCS field is inhibited, MII_TX_EOS_EOP_FLAG is ignored by the EOS apparatus, and start and end of frame Flag Sequences are always inserted. This is non-standard operation, as the FCS field is mandatory according to ITU-T X.85. This feature is required to insure proper operation at the receive side during testing periods in which the FCS is inhibited and single byte packets are possible.

2. Address and Control Fields

X.86 standards specify two fields immediately following the start of frame Flag Sequence: an Address byte, set to "0x0c", and a Control byte, which is defined to be 00000011. In EOS mode (MII_TX_EOS=1), the EOS apparatus will optionally insert these fields, if MII_TX_EOS_ADRCTL_INS=1. It will not insert these fields if MII_TX_EOS_ADRCTL_INS=0 (the default).

3. Transparency Processing

In the EOS mode (MII_TX_EOS=1), an octet stuffing procedure is performed at this point, which is referred to as Transparency Processing. A specific octet, Control Escape (01111101 or hexadecimal 0x7d) is used as a marker to indicate bytes that will require specific processing at the receive side. Control Escape is used to mark any occurrence of specific codes in the frame data.

After FCS computation, the EOS apparatus examines the entire frame between any two Flag Sequences. Each occurrence of any code identified by 0x7e or 0x7d is replaced by a two octet sequence consisting of the Control Escape octet followed by the original octet exclusive-or'd with hexadecimal 0x20. The EOS apparatus performs transparency processing on the following byte sequences, with the single exception of the Flag Sequences that are inserted by the EOS apparatus to delineate the frames. Occurrences of 0x7e in the payload (between Flag Sequences) are processed as described 0x7e is encoded as 0x7d, 0x5e 0x7d is encoded as 0x7d, 0x5d.

SPE Creation

1. EOS Operation (MII_TX_EOS=1)

The EOS stream is then mapped into the payload of the SONET/SDH Synchronous Payload Envelope (SPE). The EOS octet boundaries are aligned with the SPE octet boundaries. As EOS frames are variable in length, they are allowed to cross SPE boundaries. When, during operation, there are no LAPS frames available for immediate insertion into the SPE, the Flag Sequence is transmitted to fill the time between LAPS frames. This is only done between complete frames. The available information rate for Ethernet over SONET/SDH for STS-3c/STM-1 is 149.760 Mbps.

2. FIFO Underflow

In EOS mode (MII_TX_EOS=1), the transmit FIFO will become empty as a matter of course between packets, but should not become empty during a packet transmission, i.e. after a MII_TX_SOP indication has been received, but before a MII_TX_EOP indication has been received. If it does, the EOS apparatus provides two options for handling FIFO underflow: the packet can be aborted, using the abort methods; or a special code can be transmitted, MII_TX_EOS_FIFOUNDR_BYTE[7:0], filling the SPE until valid data is once again in the FIFO. Register MII_TX_EOS_FIFOUNDR_MODE controls the response; MII_TX_EOS_FIFOUNDR_MODE=0 indicates that the packet will be aborted. This is the default value. MII_TX_EOS_FIFOUNDR_MODE=1 indicates that the special FIFO underflow code, MII_TX_EOS_FIFOUNDR_BYTE[7:0] will be transmitted while the underflow condition exists. MII_TX_EOS_FIFOUNDR_BYTE[7:0]defaults to (0x??).

SPE/VC Generation

Figure 12A:
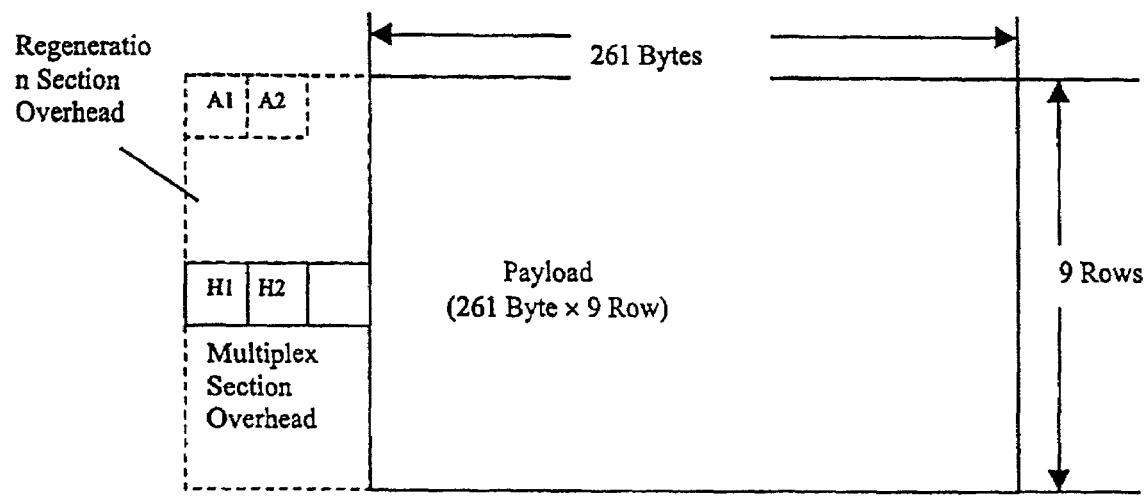
FIG. 12A shows an example of the structure of the SPE/VC of STM-N.
Figure 12B:
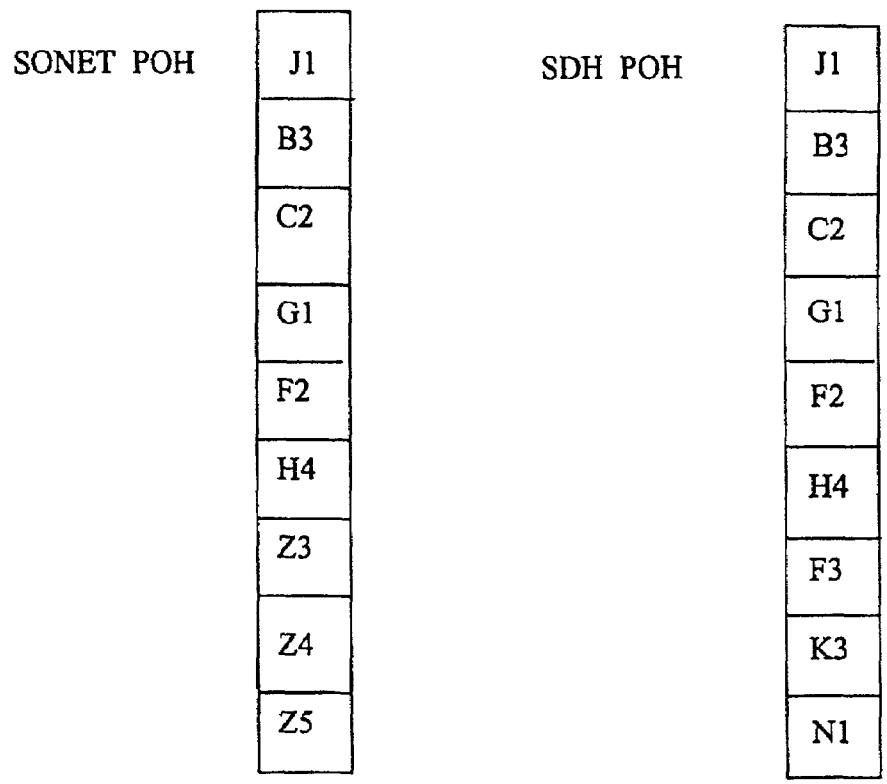
FIG. 12B is a schematic diagram illustrating the POH for SONET and SDH.
Figure 12C:
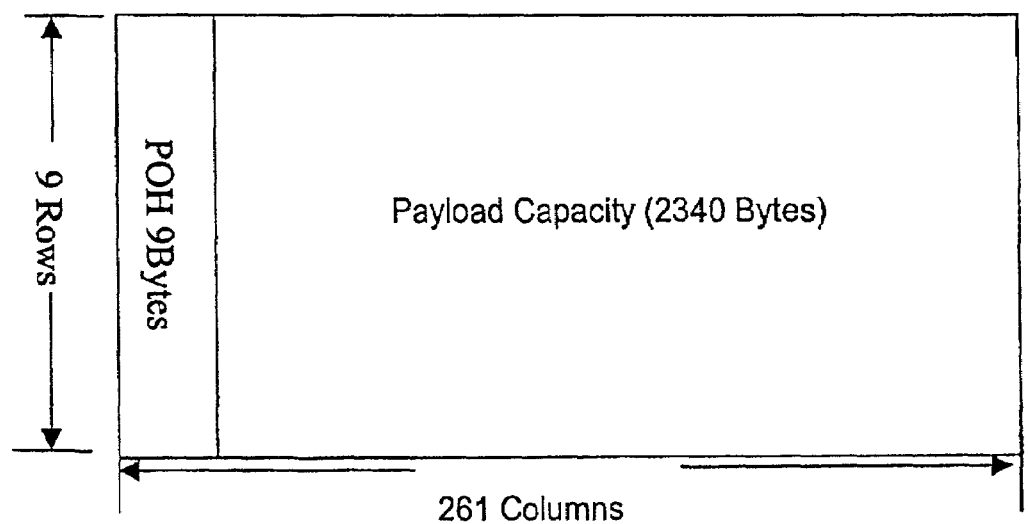
FIG. 12C is a schematic diagram illustrating the structure of the STS-3c SPE or VC-4.

The structure of the STS-3c SPE or VC-4 is shown in FIG. 12A–C. The first column of the SPE/VC is the POH (path overhead). There are 9 bytes of path overhead, and the ordering of these 9 bytes for SONET is J1, B3, C2, G1, F2, H4, Z3, Z4 and Z5, and the ordering of these 9 bytes for SDH is J1, B3, C2, G1, F2, H4, F3, K3 and N1. The first byte of the path overhead is the path trace byte, J1. Its location with respect to the SONET/SDH TOH/SOH is indicated by the associated STS/AU pointer. The following sections define the transmitted values of the POH bytes. Where the byte names differ between SONET and SDH, the SONET name will be listed first.

1. Path Trace (J1)

The EOS apparatus 1 can be provisioned to transmit either a 16-byte or a 64-byte path trace message in the J1 byte. The messages are stored in MII_TX_J1__[63:0]__[7:0]. If MII_TX_J1SEL=0, the J1 byte is transmitted repetitively as the 16-byte sequence in MII_TX_J1__[15]__[7:0] down to MII_TX_J1__[0]__[7:0]. Otherwise, the 64-byte sequence in MII_TX_J1__[63]__[7:0] down to MII_TX_J1__[0]__[7:0] is transmitted. (The 16-byte sequence is normally used in the SDH mode, and the 64-byte sequence in the SONET mode.)

2. Path BIP-8 (B3)

The Bit Interleaved Parity 8 (BIP-8) is transmitted as even parity (normal) if B3_INV=0. Otherwise, odd parity (incorrect) is generated. The BIP-8 is calculated over all bits of the previous SPE/VC (including the POH) and placed into the B3 byte of the current SPE/VC.

By definition of BIP-8, the first bit of B3 provides parity over the first bit of all bytes of the previous SPE/VC, the second bit of B3 provides parity over the second bit of all bytes of the previous SPE/VC, etc.

3. Signal Label (C2)

The signal label byte indicates the composition of the SPE/VC. The provisioned value, TX_C2__[7:0], is inserted into the generated C2 bytes.

4. Path Status (G1)

Path REI. The Receive Side monitors B3 bit errors in the received SPE/VC. The number of B3 errors detected each frame (0 to 8) is transferred from the Receive Side to the Transmit Side for insertion into the transmit path status byte, G1, as a Remote Error Indication. If FORCE_G1ERR=1, the 4 MSBs of G1 will continuously be transmitted as 1000 (for testing purposes). Else if PREI_INH=0, they are set to the binary value (0000 through 1000, indicating between 0 and 8) equal to the number of B3 errors most recently detected by the Receive Side POH monitoring block. Otherwise, they are set to all zeros.

Path RDI. Bit 5 of G1 can be used as a Path/AU Remote Defect Indication, RDI-P, or bits 5, 6, and 7 of G1 can be used as an enhanced RDI-P indicator. The values transmitted in bits 5, 6, and 7 of G1 are taken either from the TX_G1 [2:0] registers (if PRDI_AUTO=0), or the EOS apparatus automatically generates an enhanced RDI signal (if PRDI_AUTO=1 and PRDI_ENH=1), or a one bit RDI signal (if PRDI_AUTO=1 and PRDI_ENH=0). The values transmitted in bits 5, 6, and 7 of G1 are shown in Table 4.

TABLE 4

| | | Path RDI bit values | | | |
|---|---|---|---|---|---|
| PRDI-Auto | PRDI-ENH | RX-PAIS RX-LOP | RX-UNEQ | RX-PLM | G1 Bits 5, 6, and 7 |
| 0 | x | x | x | x | Tx_G1[2,0] |
| 1 | 0 | 1 | x | x | 100 |
|   |   | 0 | x | x | 000 |
|   | 1 | 1 | x | x | 101 |
|   |   | 0 | 1 | x | 110 |
|   |   | 0 | 0 | 1 | 010 |
|   |   | 0 | 0 | 0 | 001 |

If PRDI_AUTO=1, the values shown above are transmitted for a minimum of 20 frames. Once 20 frames have been transmitted with the same value, the value corresponding to the current state of the defect indication values listed in Table 1 will be transmitted. Bit 8 of G1 (the LSB) is unused, and it is set to 0.

5 Other POH Bytes

The remaining POH bytes are not supported by the EOS apparatus 1 and are transmitted as fixed all-zeros bytes. These include the path user channel (F2), the position indicator (H4), the path growth/user channel (Z3/F3), the path growth/path APS channel (Z4/K3), and the tandem connection monitoring (Z5/N1) bytes.

SONET/SDH Frame Generation

The SONET/SDH frame generation block creates an STS-3c/STM-1 by generating the Transport (Section) Overhead (TOH/SOH) bytes, filling the payload with bytes from SPE/VC, and scrambling all bytes of the SONET/SDH signal except for the first row of TOH/SOH bytes.

1. Frame Alignment

The position of the generated frame is fixed with respect to the input, TX_FRAME_IN. A start-of-frame indication output, TX_FRAME_OUT, has a fixed but unspecified relationship to the TX_FRAME_IN input. The relationship of the 1 clock cycle wide pulses on TX_FRAME_OUT to the data bytes on the Transmit Line output TX_DATA[7:0] is controlled by the MII_TX_FOUT_BYTE_TYPE[1:0] and TX_FOUT_BYTE_NUMBER[3:0] registers.

2. Payload Generation

The SONET or SDH payload is normally filled with bytes from the SPE/VC. The J1 byte of the SPE/VC is placed into column 10 of row 1 in STS-3c/STM-1 mode (MII_TX_SIG_MODE=0).

Normal generation of SONET/SDH payload is suspended during transmission of the Line (Multiplex Section, MS) Alarm Indication Signal (AIS), LAIS, or the Path (Administrative Unit, AU) AIS signals, PAIS. AIS generation is controlled by the MII_TX_LAIS and MII_TX_PAIS registers. If MII_TX_LAIS or MII_TX_PAIS=1, the entire payload (9396 or 2349 bytes) is filled with all-ones bytes.

Unless AIS is active, unequipped SPE/VC (all SPE/VC bytes are filled with all-zeros) is generated if TX_UNEQ=1.

3. TOH/SOH Generation

The SONET TOH bytes are generally the same as the SDH SOH bytes. The following sections define the values generated for all TOH/SOH bytes. Where the byte names differ between SONET and SDH, the SONET name will be listed first. Entries that are blank in standard are SONET undefined or SDH non-standardized reserved bytes. The EOS apparatus 1 fills these bytes with all zeros.

Normal generation of TOH/SOH bytes is suspended during transmission of LAIS or PAIS. If MII_TX_LAIS=1, the first 3 rows of the TOH/SOH are generated normally, but the remainder of the TOH/SOH (as well as all SPE/VC bytes) are transmitted as all-ones bytes. If MII_TX_PAIS=1, all rows of the TOH/SOH are generated normally, except for the pointer bytes in row 4. The H1, H2, and H3 bytes (as well as all SPE/VC bytes) are transmitted as all-ones bytes.

The frame bytes are normally generated with the fixed patterns:

A1: 1111__0110=F6
A2: 0010__1000=28

For testing purposes, A1 and A2 can be generated with errors. If A1A2_ERR=0, no errors are inserted. When A1A2_ERR is one, then m consecutive frames (where m is the binary equivalent of A1A2_ERR_NUM[2:0]) in each group of 8 frames, is generated with A1 and A2 exclusive-ORed with the contents of A1A2_ERR_PAT[15:0]. The MSB of A1 is XORed with A1A2_ERR_PAT[15], and the LSB of A2 is XORed with A1A2_ERR_PAT[0].

Over periods of 16 consecutive frames, the EOS apparatus 1 continuously transmits the 16-byte pattern contained in MII_TX_J0__[15:0__[7:0]. The bytes are transmitted in descending order starting with MII_TX_J0__[15]$_1$__[7:0].

The ITU-T G.707 standard states that a 16-byte section trace frame containing the Section Access Point Identifier (SAPI) defined in clause3/G.831 should be transmitted continuously in consecutive J0 bytes. Note that only the frame start marker byte should contain a 1 in its MSB.

The Section Trace function is not currently defined for SONET. Unless a similar section trace is defined for SONET, all of the MII_TX_J0 bytes should be filled with 0000__0001 so that a decimal 1 is transmitted continuously in J0. The Z0 bytes are transmitted in order as the binary equivalent of 2 to 12 in STS-12c/STM-4 (MII_TX_SIG_MODE=1) mode, or 2 to 3 in STS-3c/STM-1 (MII_TX_SIG_MODE=0) mode (this is specified in GR-253).

The B1 Bit Interleaved Parity 8 (BIP-8) is transmitted as even parity (normal) if MII_B1_INV=0. Otherwise, odd parity (incorrect) is generated. The BIP-8 is calculated over all bits of the previous STS-3c/STM-1 frame after scrambling and placed into the B1 byte of the current frame before scrambling. By definition of BIP-8, the first bit of B1 provides parity over the first bit of all bytes of the previous frame, the second bit of B1 provides parity over the second bit of all bytes of the previous frame, etc.

The orderwire bytes are defined for the purpose of carrying two 64 kb/s digitized voice signals. The F1 byte is available for use by the network provider. The transmit block accepts three serial inputs, MII_TX_E1_DATA, MII_TX_E2_DATA, and TX_F1_DATA, for insertion into the transmitted E1, E2, and F1 bytes. A single gapped 64 kHz clock (MII_TX_E1E2F1_CLK) is output from the EOS apparatus 1 in order to provide a timing reference for these three serial inputs.

The first bit (the MSB) of these bytes should be aligned with the incoming frame start pulse, MII_TX_FRAME_IN. The received E1, E2 and F1 bytes will be inserted into the outgoing SONET/SDH frame which follows the reception of the last bit of the E1, E2 and F1 bytes.

There are two DCCs defined in the TOH/SOH. The Section/Regenerator Section DCC uses the D1, D2, and D3 bytes to create a gapped 192 kb/s channel. The Line/Multiplex Section DCC uses bytes D4 through D12 to create a gapped 576 kb/s channel. The Transmit Side accepts DCC data on two serial inputs, MII_TX_SDCC_DATA and MII_TX_LDCC_DATA. In order to assure bit synchronization, the Transmit Side outputs two clocks, MII_TX_SDCC_CLK at 192 kHz(gapped) and MII_TX_LDCC_CLK at 576(gapped) kHz. The clock signals enable the retiming of bits from MII_TX_SDCC_DATA and MII_TX_LDCC_DATA into registers for inserting into the TOH/SOH. The MII_TX_SDCC_DATA and MII_TX_LDCC_DATA inputs should change on the falling edges of MII_TX_SDCC_CLK and MII_TX_LDCC_CLK, since the retiming is done on the rising edges.

The H1 and H2 bytes contain 3 fields. Because the SPE/VC is generated synchronously with the TOH, variable pointer generation is not required. Instead, active H1 and H2 bytes are generated with the fixed pointer value of 522 (decimal)=10_0000_1010(binary), and the H3 bytes are fixed at all-zeros. Thus, the J1 byte of the SPE/VC is placed into column 10 of row 1 in the STS-3c/STM-1 mode (MII_TX_SIG_MODE=0).

If MII_TX_LAIS or TX_PAIS is active, the H1, H2, and H3 bytes are transmitted as all-ones. When MII_TX_LAIS or TX_PAIS transitions so that both bits become 0, the EOS apparatus 1 transmits the first H1 byte in the next frame with an enabled New Data Flag. Succeeding frames are generated with the NDF field disabled in the first H1 byte. The first H1–H2 byte pair is transmitted as a normal pointer, with NDF=0110
SS=TX_SDH_PG, 0
Pointer Value=10__0000___1010 all other H1–H2 byte pairs are transmitted as concatenation indication bytes, with NDF=1001
SS=TX_SDH_PG, 0
Pointer Value=11__1111__1111.

In the following B2 description, the numbers vary slightly dependent upon the mode of the device (STS-12c mode vs. STS-3c). To describe the operation of both cases, the following convention will be used to identify the requirement that applies to each mode: STS-3c. There are 12 [3] B2 bytes in the TOH/SOH, and together they provide a BIP-96 [BIP-24] error detection capability.

Each B2 byte provides BIP-8 parity over bytes in 1 of 12 [3] groups of bytes in the previous frame. The B2 byte in column j, provides BIP-8 parity over bytes in the previous frame (except those in the first 3 rows of TOH/SOH) that appear in columns j+12k (j+3k), where k=0 through 89. The BIP-8 is transmitted as even parity (normal) if B2_INV=0. Otherwise, odd parity (incorrect) is generated. The BIP-8 values are calculated over bytes in the previous STS-3c/STM-1] frame before scrambling and placed into the B2 bytes of the current frame before scrambling.

K1 and the 5 MSBs of K2 are used for automatic protection switching (APS) signaling. The 3 LSBs of K2 are used as an AIS or Remote Defect Indication (RDI) at the line/MS level, and in SONET, they are also used for APS signalling. The EOS apparatus 1inserts MII_TX_K1__[7:0] in the transmitted K1 bytes and MII_TX_K2__[7:3] in the transmitted 5 MSBs of K2 bytes.

The 3 LSBs of K2 are controlled from 3 sources. In order of priority, these are

If TX_LAIS=1, they are transmitted as all-ones (as are all line/MS overhead bytes)

else i f LRDI_INH=0 and if any of (MII_RX_LOS AND NOT RX_LOS_INH), MII_RX_LOF, MII_RX_LOC or MII_RX_LAIS=1, they are transmitted as 110. Any time this particular event is active, the K2 is set to 110 for a minimum of 20 frames.

else MII_TX_K2__[2:0] is transmitted.

RX_LOS can be active high (MII_RX_LOS_LEVEL=0, the default) or active low (MII_RX_LOS_LEVEL=1). Internally, if MII_RX_LOS_LEVEL=1, MII_RX_LOS is inverted to produce MII_RX_LOS. The requirements R6-180 through R6-182 of GR-253 specify that RDI should be inserted and removed within 125 µs of detection and removal of received LOS, LOF, or LAIS.

The 4 LSBs of this byte convey synchronization status messages. The transmitted S1 byte is set equal to MII_TX_S1_[7:0].

The Receive Side monitors B2 bit errors in the received signal. The number of B2 errors detected each frame can range from 0 to 96 B2 bits per frame in STS-12c/STM-4 mode, or from 0 to 24 B2 bits per frame in STS-3c/STM-1 mode. The line/MS Remote Error Indication (REI) byte, the M1 byte, normally conveys the count of B2 errors detected in the received signal.

User can force the transmission of REI error indications by setting TX_M1_ERR=1. This causes a count of either 24 (STS-3c/STM-1 modes) to be transmitted in the M1 byte. Else if LREI_INH=0, the M1 byte is set equal to the most recent B2 error count. Otherwise, the M1 byte is set to all zeros.

Because the use of the Z1 and Z2 bytes is not standardized, the EOS apparatus 1 fills these bytes with all-zeros.

Scrambling

The input is scrambled with a frame synchronous scrambling sequence generated from the polynomial $g(x)=x^7+x^6+1$. The scrambler is initialized to 1111111 at the beginning of the first SPE/ VC byte (the byte i in column 10 of row 1 in STS-3c/STM-1 mode), and it scrambles the entire SONET/SDH signal except for the first row of TOH/SOH. For testing purposes, the scrambler can be disabled by setting the SCRINH bit to 1.

Scrambled LAPS frames (of e.g. 155M) output from the scrambling unit 6 are converted to SDH frames (of e.g. 155M) by a FIFO unit (not shown) connected between the scrambling unit 6 and SPE/BC generating unit 5, which performs its operation with PLL(Phase latch Loop).

Following description is directed to the processing of data in the Receive Direction.

1. T-to-R Loopback and LOC

The EOS apparatus 1 receive section can be configured to loopback the generated transmit signal if R_LOOP=1. Otherwise, the received signal from the SONET/SDH interface is selected. While in loopback, the TX_SONETCLK input is used to clock the receiver framer and other receiver circuitry. If loopback is not selected, the RX_SONETCLK input is used to clock this circuitry.

The RX_SONETCLK input is monitored for loss of clock using the TX_CLK input. If no transitions are detected on RX_SONETCLK for 16 periods of TX_CLK, the RX_LOC bit is set. It is cleared when transitions are detected. The RX_LOC_D delta bit is set if RX_LOC transitions from either a 0 to a 1, or from a 1 to a 0.

2. Transport Overhead Monitoring

The TOH/SOH monitoring block consists of J0, B2, K1K2, S1 and M1 monitoring. These TOH/SOH bytes are monitored for errors or changes in states.

2.1 J0 Monitoring

There are two modes of operation for J0 monitoring, one typically used in SONET applications, the other used in SDH applications. In the MII_RX_J0=0 mode (SONET), J0 monitoring consists of examining the received J0 bytes for values that match consistently for 3 consecutive frames. When a consistent J0 value is received, it is written to MII_RX_J0_[15]_[7:0].

In the MII_RX_J0=1 case (SDH), the J0 byte is expected to contain a repeating 16-byte section trace frame that includes the Section Access Point Identifier. J0 monitoring consists of locking on to the start of the 16-byte section trace frame and examining the received section trace frames for values that match consistently for 3 consecutive section trace frames. When a consistent frame value is received, it is written to MII_RX_J0_[15:0]_[7:0]. The first byte of the section trace frame (which contains the frame start marker) is written to MII_RX_J0_[15]_[7:0].

2.1.1 Framing

The MSBs of all section trace frame bytes are 0, except for the MSB of the frame start marker byte. The J0 monitor framer searches for 15 consecutive J0 bytes that have a 0 in their MSB, followed by a J0 byte with a 1 in its MSB. When this pattern is found, the framer goes into frame, J0_OOF=0. Once the J0 monitor framer is in-frame, it remains in frame until 3 consecutive section trace frames are received with at least 1 MSB bit error. If MII_RX_J0=0, the J0 frame indication is held in the In-frame state, MII_J0_OOF=0. The MII_J0_OOF_D delta bit is set when MII_J0_OOF changes state.

2.1.2 Pattern Acceptance and Comparison

Once in frame, the J0 monitor block looks for 3 consecutive 16 byte (MII_RX_J0=1) or 1 byte (MII_RX_J0=0) section trace frames. When 3 consecutive identical frames are received, the accepted frame is stored in MII_RX_J0_[15:0]_[7:0] (or MII_RX_J0_[15]_[7:0] in the SONET mode). Accepted frames are compared to the previous contents of these registers. When a new value is stored, the MII_RX_J0_D delta bit is set.

2.2 BIP-96 (B2) Checking

In the following B2 description, the numbers vary slightly dependent upon the mode of the device (STS-3c). To describe the operation of both cases, the following convention will be used to identify the requirement that applies to mode: STS-3c. The EOS apparatus 1 checks the received B2 bytes for correct BIP-8 values. (The 12 [3] B2 bytes together form a BIP-96 [BIP-24].) Even parity BIP-96 [BIP-24] is calculated over all groups of 12 [3] bytes of each frame, except the first three rows of TOH (SOH in SONET and RSOH in SDH). The calculation is done on the received data after descrambling. This value is then compared to the B2 values in the following frame after descrambling. The comparison can result in from 0 to 96 [0 to 24] mismatches (B2 bit errors). The number of B2 bit errors detected each frame may be inserted into the transmitted M1 byte.

2.2.1 B2 Error Counting

The EOS apparatus 1 contains a 20-bit B2 error counter that either counts every B2 bit error (if BIT_BLKCNT=0) or every frame with at least one B2 bit error (if BIT_BLKCNT=1). When the performance monitoring counters are latched (LATCH_EVENT transitions high), the value of this counter is latched to the B2_ERRCNT[19:0] register, and the B2 error counter is cleared. If there has been at least one B2 error since the last rising edge of LATCH_EVENT, then the B2 error second event bit, B2ERR_SECE, is set. B2 Error Rate Threshold Blocks are applies.

For the purpose of determining whether or not the bit error rate of the received signal is above or below two different provisionable thresholds (the Signal Fail and the Signal Degrade conditions), the EOS apparatus 1 provides two B2 error rate threshold blocks. If the SF block or the SD block determines that the error rate is above the threshold, it sets B2_ERR_SF or B2_ERR_SD. The delta bits B2_ERR_SF_D or B2_ERR_SD_D are set if the corresponding error rate bit changes value. For each error rate threshold block, the user may provision a BLOCK register and 2 pairs of THRESH and GROUP registers. In order to allow hysteresis in setting and clearing the state bits, each error rate threshold block has 1 pair of THRESH and GROUP registers for setting the state and 1 pair of THRESH and GROUP registers for clearing the state. Thus, the registers used in the error rate threshold blocks are while B2_ERR_SF=0, determine if it should be set using: B2_BLOCK_SF[7:0], B2_THRESH_SET_SF[7:0], and B2_GROUP_SET_SF[5:0]

while B2_ERR_SF=1, determine if it should be cleared using: B2_BLOCK_SF[7:0], B2_THRESH_CLR_SF [7:0], and B2_GROUP_CLR_SF[5:0]

while B2_ERR_SD=0, determine if it should be set using: B2_BLOCK_SD[15:0], B2_THRESH_SET_SD[5:0], and B2_GROUP_SET SD[5:0]

while B2_ERR_SD=1, determine if it should be cleared using: B2_BLOCK_SD[15:0], B2_THRESH_CLR_SD[5:0], and B2_GROUP_CLR_SD[5:0]

3. K1K2 Monitoring

The K1 and K2 bytes, which are used for sending Line/MS AIS or RDI and for APS signalling, are monitored for change in status.

3.1 Line/MS AIS Monitoring and LRDI Generation

The 3 LSBs of K2 can be used as a AIS or Remote Defect Indication (RDI) at the line/MS level. If they are received as "111" for K2_CONSEC[3:0] consecutive frames, RX_LAIS is set, and the RX_LAIS_OUT output is high. If for K2_CONSEC[3:0] consecutive frames, they are not received as "111", then RX_LAIS and RX_LAIS_OUT are cleared. The RX_LAIS_D delta bit is set when RX_LAIS changes state.

3.2 Line/MS RDI Monitoring

The 3 LSBs of K2 are also monitored for K2_CONSEC [3:0] consecutive receptions or non-receptions of "110". When this is received, RX_LRDI is set or cleared. RX_LRDI_D is set when RX_LRDI changes state.

3.3 APS Monitoring

If the K1 byte and the 4 MSBs of the K2 byte, which are used sending APS requests and channel numbers, are received identically for 3 consecutive frames, their values are written to RX_K1_[7:0] and RX_K2_[7:4]. Accepted values are compared to the previous contents of these registers, and when a new 12-bit value is stored, the RX_K1_D delta bit is set.

The K1 byte is checked for instability. If, for 12 successive frames, no 3 consecutive frames are received with identical K1 bytes, the K1_UNSTAB bit is set. It is cleared when 3 consecutive identical K1 bytes are received. When K1_UNSTAB changes state, the K1_UNSTAB_D delta bit is set. Bits 3 down to 0 of K2 may contain APS mode information. These bits are monitored for K2_CONSEC[3: 0] consecutive identical values. RX_K2_[3:0] is written when this occurs, unless the value of bits 2 and 1 of K2 is "11" (indicating Line/MS AIS or RDI). The RX_K2_D delta bit is set when a new value is written to RX_K2_[3:0].

The three delta bits associated with APS monitors, MII_RX_K1_D, RX_K2_D and MII_K1_UNSTAB_D all contribute to an APS interrupt signal, APS_INTB. In addition, these three deltas also contribute to the standard summary interrupt signal, INTB.

3.4 S1 Monitoring

The 4 LSBs of received S1 bytes are monitored for consistent values in either 8 consecutive frames in the SONET mode, MII_RX_SDH_S1=0, or 3 consecutive frames in the SDH (MII_RX_SDH_S1=1) mode. When these bits contain a consistent synchronization status message, the accepted value is written to RX_S1_[3:0]. Accepted values are compared to the previous contents of this register, and when a new value is stored, the MII_RX_S1_D delta bit is set. The S1 byte is also checked for message failure. If no message has met the above validation criterion (whether it is the same or different from the last accepted value) at any time since the last rising edge of LATCH_EVENT, then the S1 fail second event bit, S1_FAIL_SECE, is set.

3.5 M1 Monitoring

The M1 byte indicates the number of B2 errors that were detected by the remote terminal in its received signal. The EOS apparatus 1 contains a 20-bit M1 error counter that either counts every error indicated by M1 (if BIT_BLKCNT=0) or every frame received with M1 not equal to 0 (if BIT_BLKCNT=1). When MII_RX_SIG_MODE=1, the valid values of M1 for BIT_BLKCNT=0 are 0 to 96; any other value is interpreted as 0 errors. When RX_SIG_MODE=0 and BIT_BLKCNT=0, the valid values of M1 are 0 to 24; any other value is interpreted as 0 errors. When the performance monitoring counters are latched, the value of this counter is latched to the M1_ERRCNT[19:0] register, and the M1 error counter is cleared.

If there has been at least one received M1 error indication since the last rising edge of LATCH_EVENT, then the M1 error second event bit, M1_ERR_SECE, is set.

4. Transport Overhead Drop

The TOH/SOH drop block outputs the received E1, F1, and E2 bytes and 2 serial DCC channels.

4.1 Order-wire (E1 and E2) and Section User Channel (F1)

The three serial outputs, MII_RX_E1_DATA, MII_RX_E2_DATA, and MII_RX_F1_DATA, contain the values of the received E1, E2, and F1 bytes. A single gapped 64 kHz clock reference output (MII_RX_E1E2F1_CLK) is provided as well. The MSB of the E1, E2 and F 1 bytes appears in the first 64 kHz clock cycle (gapped) after a rising edge of RX_FRAME_OUT.

4.2 Data Communications Channels, DCC, (D1–D12)

There are two DCCs defined in the TOH/SOH. The Section/Regenerator Section DCC uses the D1, D2, and D3 bytes to create a gapped 192 kb/s channel. The Line/Multiplex Section DCC uses bytes D4 through D12 to create a gapped 576 kb/s channel. The TOH/SOH drop block outputs DCC data on two serial channels, RX_SDCC_DATA and RX_LDCC_DATA. These channels are synchronous to the outputs MII_RX_SDCC_CLK and MII_RX_LDCC_CLK. The DCC data outputs change on the falling edges of RX_SDCC_CLK and RX_LDCC_CLK.

5. Pointer State Determination

Pointer state determination involves examining H1–H2 bytes to establish the state of the STS-3c/AU-4 received pointer.

5.1 State Transition Rules

In the following pointer state determination description, the numbers vary slightly dependent upon the mode of the device (STS-3c). To describe the operation of both cases, the following convention will be used to identify the requirement that applies to mode: STS-3c.

The first pair of H1–H2 bytes contain the STS-3c/AU-4 pointer. They are monitored and are considered to be in 1 of the following 3 states:
  Normal (NORM=00)
  Alarm Indication Signal (AIS=01)
  Loss of Pointer (LOP=10)
The remaining 11 [2] pairs of H1–H2 bytes are monitored for correct concatenation indication. They are considered to be in 1 of the following 3 states:
  Concatenated (CONC=11)
  Alarm Indication Signal (AISC=01)
  Loss of Pointer (LOPC=10)
The individual states are stored in MII_PTR_STATE_[1:12]_[1:0] [MII_PTR_STATE_[1:3]_[1:0]], where MII_PTR_STATE_[i]_[1:0] indicates the state of the i'th pair of H1–H2 bytes. The states of individual pairs of H1–H2 bytes are then combined to determine the state of the STS-3c/AU-4 pointer.

5.2 State of STS-3c/AU-4 Pointer

The EOS apparatus 1 supplies the register state bits MII_RX_PAIS and MII_RX_LOP that indicate the pointer state of the received STS-3c/AU-4 pointer. These may be in 1 of 3 states:
  Normal (MII_RX_PAIS=0 and RX_LOP=0)—MII_PTR_STATE_[1]_[1:0] is NORM (00) and all other PTR_STATE_[i]_[1:0] are CONC (11).
  Path/AU AIS (MII_RX_PAIS=1 and RX_LOP=0)—All PTR_STATE_[i]_[1:0] are AIS or AISC (01).
  Loss of Pointer (MII_RX_PAIS=0 and MII_RX_LOP=1)—All others (The PTR_STATE_[i]_[1:0] values do not satisfy either Normal or Path/AU AIS criteria).
The MII_RX_PAIS and MII_RX_LOP signals contribute to the Path Remote Defect Indication (PRDI). Changes in these state values are indicated by the MII_RX_PAIS_D and MII_RX_LOP_D delta bits.

6. Pointer Interpretation

The first H1–H2 byte pair is interpreted to locate the start of the SPE/VC. The rules for pointer interpretation are:
1. During normal operation, the pointer locates the start of the SPE/VC.
2. Any variation from the current accepted pointer is ignored unless a consistent new value is received 3 times consecutively, or it is preceded by one of the rules 3, 4, or 5. Any consistent new value received 3 times consecutively overrides rules 3 or 4.
3. In the case of MII_RX_SDH_PI=0, if at least 3 out of 4 of the NDF bits match the disabled indication (0110) and at least 8 out of 10 of the pointer value bits match the current accepted pointer with its I-bits inverted, a positive justification is indicated. The byte following the H3 byte is considered a positive stuff byte, and the current accepted pointer value is incremented by 1 (mod 783).
  In the case of MII_RX_SDH_PI=1, if at least 3 out of 4 of the NDF bits match the disabled indication (0110), 3 or more of the pointer value I-bits and 2 or fewer of the pointer value D-bits match the current accepted pointer with all its bits inverted, and either the received SS-bits are 10 or MII_RX_SS_EN=0, a positive justification is indicated. The byte following the H3 byte is considered a positive stuff byte, and the current accepted pointer value is incremented by 1 (mod 783).
4. In the case of MII_RX_SDH_PI=0, if at least 3 out of 4 of the NDF bits match the disabled indication (0110) and at least 8 out of 10 of the pointer value bits match the current accepted pointer with its D-bits inverted, a negative justification is indicated. The H3 byte is considered a negative stuff byte (it is part of the SPE), and the current accepted pointer value is decremented by 1 (mod 783).
  In the case of MII_RX_SDH_PI=4, if at least 3 out of 4 of the NDF bits match the disabled indication (0110), 3 or more of the pointer value D-bits and 2 or fewer of the pointer value I-bits match the current accepted pointer with all its bits inverted, and either the received SS-bits are 10 or MII_RX_SS_EN=0, a negative justification is indicated. The H3 byte is considered a negative stuff byte (it is part of the VC), and the current accepted pointer value is decremented by 1 (mod 783).
5. In the case of MII_RX_SDH_PI=0, if at least 3 out of 4 of the NDF bits match the enabled indication (1001), and the pointer value is between 0 and 782, the received pointer replaces the current accepted pointer value.
  For MII_RX_SDH_PI=1, if at least 3 out of 4 of the NDF bits match the enabled indication (1001), the pointer value is between 0 and 782, and either the received SS-bits are 10 or MII_RX_SS_EN=0, the received pointer replaces the current accepted pointer value.

Using these pointer interpretation rules, the Pointer Interpreter block determines the location of SPE/VC payload and POH bytes.

6.1 Pointer Processing

Regarding the pointer tracking algorithm implemented in the EOS apparatus 1, Please refer to [G.783] and [GR-253] for definitions of the transitions. The pointer tracking state machine is based on the pointer tracking state machine found in the ITU-T requirements, and is also valid for both Bellcore and ANSI. The AIS to LOP transition of the state machine does not occur in Bellcore mode (i.e., set by setting the BELLCORE bit to logic 1).

Four pointer tracking state machines are employed, one for each AU-4/STS-3c. The pointer tracking uses the H11 and H21 bytes. The pointer is extracted from the concatenation of the H1n and H2n bytes, and is interpreted as follows:

N=New Data Flag Bits. This is interpreted as enabled=1001 or 0001/1101/1011/1000, and normal or disabled=0110 or 1110/0010/0100/0111 (i.e., a single-bit error is tolerated).
SS=Size bits used in pointer tracking state machine interpretation if enabled by BELLCORE control bit being set to 0. When BELLCORE is set to 1 these bits are ignored, but when it is set to 0 these bits are expected to be 10.
I=Increment Bits defined as bit 7 of H1n and bits 1, 3, 5 and 7 of H2n.
D=Decrement Bits defined as bit 8 of H1n and bits 2, 4, 6 and 8 of H2n.
Negative Justification: Inverted 5 D-bits and accept majority rule. The 8 of 10 objective of O3-92 in [GR-253] can be enabled by setting the Just ITU bit in OR#Conf3 to 0.
Positive Justification: Inverted 5 I-bits and accept majority rule. The 8 of 10 objective of O3-92 in [GR-253] can be enabled by setting the Just ITU bit in OR#Conf3 to 0.

For STM-1/STS-3c operation, the pointer is a binary number with the range of 0 to 782 (decimal). It is a 10-bit value derived from the two least significant bits of the H1 byte, with the H2 byte concatenated, to form an offset in 3-byte counts from the H3 byte location. For example, for an STM-1 signal, a pointer value of 0 indicates that the VC-4 starts in the byte location 3 bytes after the H3 byte, whereas an offset of 87 indicates that the VC-4 starts three bytes after the K2 byte.

In STM-4/STS-12 modes there are four byte-interleaved AU-4s, so there are four H1/H2 byte pairs for determining the beginning (i.e., the J1 byte location) of their respective VC-4s. The operation of the four pointer tracking state machines in this case is identical to that for 4×STM-1/STS-3c operation.

When dealing with STS-12c/STM-4c, the pointer tracking state machine for macro 1 is used to locate the beginning of the VC-4-4c. The pointer tracking uses the H11 and H21 bytes. The pointer is extracted from the concatenation of the H11 and H21 bytes, and is interpreted as shown above. However, the offset that is formed represents the number of 12-byte counts from the H3 byte location. For example, for an STM-12c signal, a pointer value of 0 indicates that the VC-4 starts in the byte location twelve bytes after the H3 byte, whereas an offset of 87 indicates that the VC-4 starts twelve bytes after the K2 byte. The concatenation indication bytes are also examined in the corresponding macros (macros 2–4) and are monitored for LOP and HPAIS per the state machine in Annex C of [G.783]. The state diagram below illustrates the concatenation indicator state transition. Please refer to [G.783] for definitions of the transitions.

In addition, 8-bit counters are provided for counting positive and negative justification events, as well as NDF events. Status bits are provided for indicating the detection of negative justification, positive justification, NDF, invalid pointer, new pointer and concatenation indication. When the LOP or LOPC states are entered as indicated in the above figures, the LOP interrupt request bit in the corresponding OR#IRQ2 register will be set. Likewise if the AIS or AISC states are entered the corresponding HPAIS interrupt request bit will become set.

After the processing of pointer, the SDH/SONET frames (of e.g. 155.520 Mbit/s) are converted to LAPS frames (of e.g. 155.520 Mbit/s) by a FIFO unit (not shown) connected between the pointer processing unit 10 and the de-scrambling unit 11, which uses PLL to perform its operation.

7. Path Overhead Monitoring

The POH monitoring block consists of J1, B3, C2, and G1 monitoring. These POH bytes are monitored for errors or changes in states.

7.1. Path Trace (J1) Capture/Monitor

As with J1 insertion, the EOS apparatus 1 supports two methods of Path Trace (J1) capture. The first, typically used in SONET applications, captures 64 consecutive J1 bytes in the STS-3c/AU-4. The second, used in SDH applications, looks for a repeating 16 consecutive J1 byte pattern. When it has detected a consistent 16 bytes pattern for three consecutive instances, the J1 pattern is stored in designated registers.

7.1.1 SONET J1 Capture

When MII_RX_SDHI_J1=0 (SONET mode), the EOS apparatus 1 can be provisioned to capture a sample of the path trace message. When J1_CAP transitions from 0 to 1, the EOS apparatus 1 captures 64 consecutive J1 bytes from the specified tributary and writes them to MII_RX_J1__[63:0]__[7:0].

No path trace frame structure is defined for SONET, but GR-253 does recommend that the 64-byte sequence consist of a string of ASCII characters padded out to 62 bytes with NULL characters (00) and terminated with <CR> (0D) and <LF> (0A) bytes. If the J1_CRLF bit is set, the EOS apparatus 1 captures the first 64 byte string it receives in the J1 byte position that ends with {0D, 0A}. If the J1_CRLF bit is 0, the EOS apparatus 1 captures the next 64 J1 bytes without regard to their content. On completion of the capture, the EOS apparatus 1 sets the J1_CAP_E event bit.

7.1.2 16-Byte J1 Monitoring

If MII_RX_SDH_J1=1 (normally used in the SDH mode), the J1 bytes are expected to contain a repeating 16-byte path trace frame that includes the PAPI. In this mode, the J1_CAP, J1_CRLF, and J1_CAP_E bits are not used. J1 monitoring consists of locking on to the start of the 16-byte path trace frame and examining the received path trace frames for values that match consistently for 3 consecutive path trace frames. When a consistent frame value is received, it is written to MII_RX_J1__[15:0]__[7:0]. The first byte of the path trace frame (which contains the frame start marker) is written to MII_RX_J1__[15]__[7:0].

Framing. The MSBs of all path trace frame bytes are 0, except for the MSB of the frame start marker byte. The J1 monitor framer searches for 15 consecutive J1 bytes that have a 0 in their MSB, followed by a J1 byte with a 1 in its MSB. When this pattern is found, the framer goes into frame, J1_OOF=0. Once the J1 monitor framer is in-frame, it remains in frame until 3 consecutive path trace frames are received with at least 1 MSB bit error. (In the SONET mode, the J1 frame indication is held in the In-frame state, J1_OOF=0.) The J1_OOF_D delta bit is set when J1_OOF changes state.

Pattern Acceptance and Comparison. Once in frame, the J1 monitor block looks for 3 consecutive 16-byte path trace frames. When 3 consecutive identical frames are received, the accepted frame is stored in MII_RX_J1__[15:0]__[7:0].

Accepted frames are compared to the previous contents of these registers. When a new value is stored, the RX_J1_D delta bit is set.

7.2. BIP-8 (B3) Checking

The EOS apparatus 1 checks the received B3 bytes for correct BIP-8 values. Even parity BIP-8 is calculated over all bits in the SPE/VC (including the POH) each frame. These values are then compared to the B3 values received in the following frame. The comparison can result in from 0 to 8 mismatches (B3 bit errors). This value may be inserted into the Transmit Side G1 byte.

The EOS apparatus 1 contains a 16-bit B3 error counter that either counts every B3 bit error (if BIT_BLKCNT=0) or every frame with at least one B3 bit error (if BIT_BLKCNT=1). When the performance monitoring counters are latched (LATCH_EVENT transitions high), the value of this counter is latched to the B3ERRCNT_[15:0]register, and the B3 error counter is cleared. If there has been at least one B3 error since the last rising edge of LATCH_EVENT, then the B3 error second event. bit, B3ERR_SECE, is set.

7.3. Signal Label (C2) Monitoring

The received C2 bytes are monitored so that reception of the correct type of payload can be verified. When a consistent C2 value is received for 5 consecutive frames, the accepted value is written to MII_RX_C2[7:0]. The MII_RX_C2_D delta bit is set when a new C2 value is accepted.

The expected value of the received C2 bytes is provisioned in EXP_C2[7:0]. If the current accepted value does not match the expected value, and the accepted value is NOT the all zeros Unequipped label, the 01(hex) Equipped—non-specific label, the FC(hex) payload defect label, the FF(hex) reserved label, then the Payload Label Mismatch register bit, MII_RX_PLM, is set high.

If the current accepted value is the all zeros Unequipped label, and the provisioned EXP_C2[7:0]!=00(hex), then the Unequipped register bit, MII_RX_UNEQ, is set high.

The MII_RX_PLM and MII_RX_UNEQ signals contribute to the insertion of Path RDI on the Transmit Side. When MII.RX_PLM or MII_RX_UNEQ changes state, the MII_RX_PLM_D or the MII_RX_UNEQ_D delta bit is set.

7.4. Path Status (G1) Monitoring

The G1 monitoring comprises Path REI Monitoring and Path RDI Monitoring.

7.4.1 Path REI Monitoring

Bits 1 through 4 (the 4 MSBs) of the path status byte indicate the number of B3 errors that were detected by the remote terminal in its received SPE/VC signal. Only the binary values between 0 and 8 are legitimate. If a value greater than 8 is received, it is interpreted as 0 errors (as is specified in GR-253 and ITU-T Recommendation G.707). The EOS apparatus 1 contains a 16-bit G1 error counter that either counts every error indicated by G1 (if BIT_BLKCNT=0) or every frame received with the first 4 bits of G1 not equal to 0 (if BIT_BLKCNT=1). When the performance monitoring counters are latched (LATCH_EVENT transitions high), the value of this counter is latched to the G1_ERRCNT[15:0] register, and the G1 error counter is cleared.

If there has been at least one received G1 error indication since the last rising edge of LATCH_EVENT, then the G1 error second event bit, G1ERR_SECE, is set.

7.4.2 Path RDI Monitoring

The EOS apparatus 1 can be provisioned to monitor bit 5 of G1 (RDI-P indicator), if MII_RX_PRDI5=1; or bits 5, 6 and 7 of G1 (enhanced RDI-P indicator), if MII_RX_PRDI5=0. Monitoring consists of checking for G1_CONSEC[3:0] consecutive received values of the monitored bit(s) that are identical. When a consistent value is received, bits 5, 6 and 7 of G1 are written to MII_RX_G1[2:0]. Accepted values are compared to the previous contents of this register. (All 3 bits are written, but if MII_RX_PRDI5=1, only G1 bit 5 and MII_RX_G1[2] are involved in the comparisons.) When a new value is stored, the MII_RX_G1_D delta bit is set.

7.5. Other POH Bytes

The remaining POH bytes are not monitored by the EOS apparatus 1. These include the path user channel (F2), the position indicator (H4), the path growth/user channel (Z3/F3), the path growth/path APS channel (Z4/K3), and the tandem connection monitoring (Z5/N1) bytes.

8. Receive Payload Descrambling

After the payload is extracted from the SONET/SDH signal, the payload data is descrambled using a self-synchronizing X 43+1 descrambler. In all modes, register MII_RX_DSCR_INH controls the operation of the descrambler. When MII_RX_DSCR_INH=0 (the default), the descrambler is enabled. When MII_RX_DSCR_INH=1, operation of the descrambler is inhibited.

The EOS apparatus 1 provides a self-synchronizing descrambler based on the following generator polynomial: $X^{43}+1$ 9. Receive LAPS Processing At this point the SPE has been extracted from the SONET/SDH frame, and is passed on the LAPS processor for further processing. In EOS mode (MII_RX_POS=1), the LAPS processing provides the extraction of LAPS packets/frames from the SPE.

9.1. LAPS Framer

In EOS mode (MII_RX_POS=1), LAPS frames are extracted from the SPE payload by identifying the Flag Sequence (0x7e) that begins/ends a frame.

The EOS apparatus 1 examines each octet of the payload. When an octet with bit pattern 0x7e is discovered, the EOS apparatus 1 recognizes this as the start/end of a packet. The octets that follow this Flag Sequence are then examined. If these are also 0x7e, they are Flag Sequences used to fill the Inter-Packet gap, and are discarded. The first octet NOT equal to 0x7e that follows the initial Flag Sequence is considered the first octet of the LAPS frame. After the start of frame flag, the EOS apparatus 1 continues to examine each octet of the payload for the Flag Sequence. If it locates the bit pattern 0x7e and the immediately preceding octet is Control Escape (0x7d), the frame is aborted. Otherwise, a normal end of the current frame is declared. In the special case when termination of the FCS field is inhibited, a minimum of two Flag Sequences must be detected between frames.

9.2. Removal of Transparency Byte Stuffing 9.3.1 EOS Mode

In EOS mode (MII_RX_POS=1) following the LAPS framer, the EOS apparatus 1 reverses the transparency byte stuffing process to recover the original packet stream. The FIFO underflow byte sequence, which may be inserted by the transmit side during periods of FIFO underflow, will be detected and removed during the transparency processing if MII_RX_POS_FIFOUNDR_MODE=1. The default value is disabled, MII_RX_EOS_FIFOUNDR_MODE=0. The special FIFO underflow byte code is programmed using register MII_RX_EOS_FIFOUNDR_BYTE[7:0].

9.3.2 Underflow Byte Removal

In EOS mode, if MII_RX_EOS_FIFOUNDR_MODE=1, bytes that match the FIFO underflow byte code (MII_RX_EOS_FIFOUNDR_BYTE[7:0]) are discarded if they are not immediately preceded by the Control Escape code (0x7d).

9.4. Errored Frames

In EOS mode (MII_RX_EOS=1), a special byte code (0x7d7e) is utilized in EOS mode to indicate that a frame has been aborted. If this byte code is received, the frame that contains it is aborted. No further octets from the packet are sent to the FIFO, and if the packet is transmitted to the Link Layer device, it is marked as errored.

The EOS apparatus 1 contains an 8-bit error counter that counts every packet in which the abort sequence is detected. When the performance monitoring counters are latched (LATCH_EVENT transitions high), the value of this counter is latched to the MII_RX_EOS_PABORT_ERRCNT[7:0] register, and the packet abort error counter is cleared.

If there has been at least one packet abort error since the last rising edge of LATCH_EVENT, then the packet abort error second event bit, MII_RX_EOS_PABORT_ERR_SECE, is set.

As an alternative, a packet can also be aborted by inverting the FCS bytes. This will appear to the EOS apparatus 1 Receive LAPS Processor as simply an FCS error, and is handled as described in the following section.

The EOS apparatus 1 also, as an option, views a packet as being errored and marks it accordingly if it violates minimum or maximum packet sizes. The packet sizes refer to the size of the packets output from the EOS apparatus 1 only, and do not include the dropped flag sequence, address, control, transparency, FIFO underflow and FCS bytes. These minimum and maximum sizes are programmable via the management interface. Register MII_RX_EOS_PMIN[3:0] contains the minimum packet size. The default value of this register is 0. Register MII_RX_EOS_PMAX[15:0] contains the maximum packet size. The default value of this register is 0x05E0.

The EOS apparatus 1 disables/enables minimum and maximum size packet checking when instructed to through the management interface. Registers MII_RX_EOS_PMIN_ENB and MII_RX_EOS_PMAX_ENB (both default to 0) control how violations of the minimum and maximum packet sizes are handled. When either is set to 1, any violation of the corresponding packet size restriction is marked as errored.

The EOS apparatus 1 contains two 8-bit error counters that count every violation of the maximum and minimum packet size limits. When the performance monitoring counters are latched (LATCH_EVENT transitions high), the value of these counters are latched to the MII_RX_EOS_PMIN_ERRCNT[7:0] and MII_RX_EOS_PMAX_ERRCNT[7:0] registers, and the packet size violation counters are cleared.

If there has been at least one packet size violation error since the last rising edge of LATCH_EVENT, then the appropriate packet size violation second event bit, MII_RX_EOS_PMIN_ERR_SECE or MII_RX_EOS_PMAX_ERR_SECE, is set.

9.5. Frame Check Sequence (FCS) Field

In EOS mode (MII_RX_EOS=1), an FCS is then calculated and checked against the FCS bytes at the end of each frame. This option is controlled by register MII_RX_EOS_FCS_INH. A value of MII_RX_EOS_FCS_INH=0 enables the FCS. A value of MII_RX_EOS_FCS_INH=1 disables it. only a 32 bit check sequence (CRC-32) is applied. MII_RX_EOS_FCS_MODE=0 places the device in FCS-32 mode.

The EOS apparatus 1 provides CRC-32 functionality, using the following generator polynomial: $1+x+x^2+x^4+x^5+x^7+x^8+x^{10}+x^{11}+x^{12}+x^{16}+x^{22}+x^{23}+x^{26}+x^{32}$. The FCS field is calculated over all bits frame, except the Flag Sequence and the FCS field itself.

If MII_RX_EOS_FCS_BIT_ORDR=0 (the default), the received data is read into the shift register in big endian bit order (MSB first). If MII_RX_EOS_FCS_BIT_ORDR=1, the received data is read into the shift register in little endian bit order (LSB first). In either case, the data is restored to big endian order for processing after the FCS calculation.

The resulting FCS is compared against the value in the received FCS field. If an error is detected, the management control interface is notified, the appropriate counter incremented, and the last word of the packet is marked as errored in the FIFO. The EOS apparatus 1 contains a 20-bit FCS error counter that counts every FCS CRC violation. When the performance monitoring counters are latched (LATCH_EVENT transitions high), the value of this counter is latched to the MII_RX_EOS_FCS_ERRCNT[19:0] register, and the FCS error counter is cleared.

If there has been at least one FCS error since the last rising edge of LATCH_EVENT, then the FCS error second event bit, MII_RX_EOS_FCS_ERR_SECE, is set.

Following FCS checking, the FCS bytes are terminated (they are not stored in the FIFO). If the FCS checking is disabled via the management interface, the last 2 or 4 bytes are sent on to the FIFO. Should an FCS error be detected, the packet is marked as errored (RX_ERR) when transmitted to the Link Layer device.

9.6. LAPS Frame Termination

In EOS mode (MII_RX_EOS=1), after FCS calculation, the following LAPS bytes are monitored and optionally terminated:

9.6.1 Flag Sequence

All occurrences of the Flag Sequence, used for frame delineation and inter-frame fill purposes are deleted. The start and end of frame information is retained by the EOS apparatus 1 and transmitted to the Link Layer via the RX_SOP and RX_EOP signals.

9.6.2 Address and Control Bytes

The address and control bytes (the first two bytes of the LAPS frame following the Flag Sequence) are monitored by the EOS apparatus 1. For the first embodiment of the invention, monitoring consists of checking for the valid Address and Control fields (0xFF03); and for the second embodiment of the invention, monitoring consists of checking for the valid Address and Control fields (0x0403) or (0xFF03). If no match is detected, this field is assumed to be compressed and was not sent. If invalid values are detected, these two bytes are not dropped, and are passed on the Link Layer via the MII interface. The management control interface is notified of the detection of invalid Address and Control fields by setting MII_RX_EOS_ADRCTL_INVALID=1. Changes in the state of MII_RX_EOS_ADRCTL_INVALID are indicated by setting its corresponding delta bit MII_RX_EOS_ADRCTL_INVALID_D to 1.

If valid Address and Control fields are detected, the EOS apparatus 1 terminates these two bytes, and does not pass them on to the RX FIFO. The deletion of valid address and control bytes can be inhibited by setting MII_RX_EOS_ADRCTL_DROP_INH=1. The default value of this register is 0 (automatic drop enabled).

9.6.3 FCS Bytes

As mentioned in the FCS section, the four FCS bytes are also terminated by the EOS apparatus 1. If the FCS checking is disabled via the management control interface (MII_RX_EOS_FCS_INH=1), this termination is also disabled, and the last four bytes in the LAPS frame are sent on to the Link Layer.

10. Receive FIFO Interface

10.1. System Side Packet Loopback

The EOS apparatus 1 provides the capability for the user to loopback the packets received via the System Interface. When SYS_T_TO_R_LOOP=1, the packets received from the Link Layer device are routed from the transmit FIFO directly to the receive FIFO, and output back to the Link Layer device that originated the cell data. When SYS_T_TO_R_LOOP is set to 0, the packets data received within the SONET/SDH line signals are transmitted to the receive FIFOs and then out the System Interface.

10.2. FIFO Processing

The EOS apparatus 1 writes packets data into the FIFO in preparation for output via the Receive System Inter-face to the Link Layer device. The FIFO holds 512 octets as a minimum value. Along with the packet, the following indicators, when applicable, must accompany each word in the FIFO: start of packet, end of packet, if end of packet, how many octets in word (1 or 2), and whether or not the packet is errored. Once an error has been detected in a packet, no further bytes from that packet are loaded into the FIFO.

The state of the FIFO is monitored by the EOS apparatus 1. FIFO overflow events are reported to the management control interface by setting MII_RX_FIFOOVER_E=1. The occurrence of a FIFO overflow also causes the appropriate performance monitoring counter to be incremented.

The EOS apparatus 1 contains an 8-bit FIFO overflow error counter that counts every packet affected by a FIFO overflow event. When the performance monitoring counters are latched (LATCH_EVENT transitions high), the value of this counter is latched to the MII_RX_FIFOOVER_ERRCNT[7:0] register, and the FIFO overflow error counter is cleared.

If there has been at least one FIFO overflow event since the last rising edge of LATCH_EVENT, then the FIFO overflow error event bit, MII_RX_FIFOOVER_ERR_SECE, is set.

Once an overflow error has been detected, no further bytes from the packet are sent to the FIFO. In the EOS mode (MII_RX_EOS=1), the last word of the packet is marked as errored (RX_ERR).

This FIFO immediately precedes the Receive System compatible interface. Its purpose is to perform the rate adaptation function between the SONET clock domain and the Link Layer clock domain.

10.3. Errored Packet Handling

A determining unit (not shown) is provided in the RX processing unit 12 for determining the type of the received data packets, generating a corresponding predetermining SAPI, and check errors occurred in the frames.

In EOS mode (MII_RX_EOS=1), the EOS apparatus 1 will mark as errored any packets that have been corrupted by FIFO overflow events, using RX_ERR.

An invalid frame is a frame which:
a) is not properly bounded by two flags; or
b) has fewer than eight octets between flags of frames; or
c) contains a frame check sequence error; or
d) contains a service access point identifier (see A.3.3 of ITU-T X.85) which is mismatched or not supported by the receiver; or
e) contains an unrecognized Control field value; or
f) ends with a sequence of more than six "1" bits.

Invalid frames shall be discarded without notification to the sender. No action is taken as the result of that frame.

10.4. Receive Data Parity

As per the MAC-PHY specifications, the EOS apparatus 1 provides a parity check bit that accompanies each one or two octet word (MII_RX_SYS_DAT[15:0]) transmitted to the Link Layer device. This parity check bit is present on pin RX_PRTY. This bit provides an odd parity check as a default (MII_RX_PRTY_MODE=0). Even parity is provided if MII_RX_PRTY_MODE=1.

The rates adaptation from LAPS to MII is performed in the RX FIFO 13. The periodic LAPS frames (e.g. 155M) output from the RX LAPS processing unit 12 are converted in to burst MII frames (e.g. 100M). The operation as for the rates adaptation is opposite to that of the TX FIFO. By doing this, the SDH/SONET frames received are converted to MII frames and transmitted to Ethernet layer via transformer 19.

MII Interface Requirements

MII interface requirements of the EOS apparatus 1 is based on the definition in IEEE802.3 on the Reconciliation sublayer and media independent interface.

Figure 13:
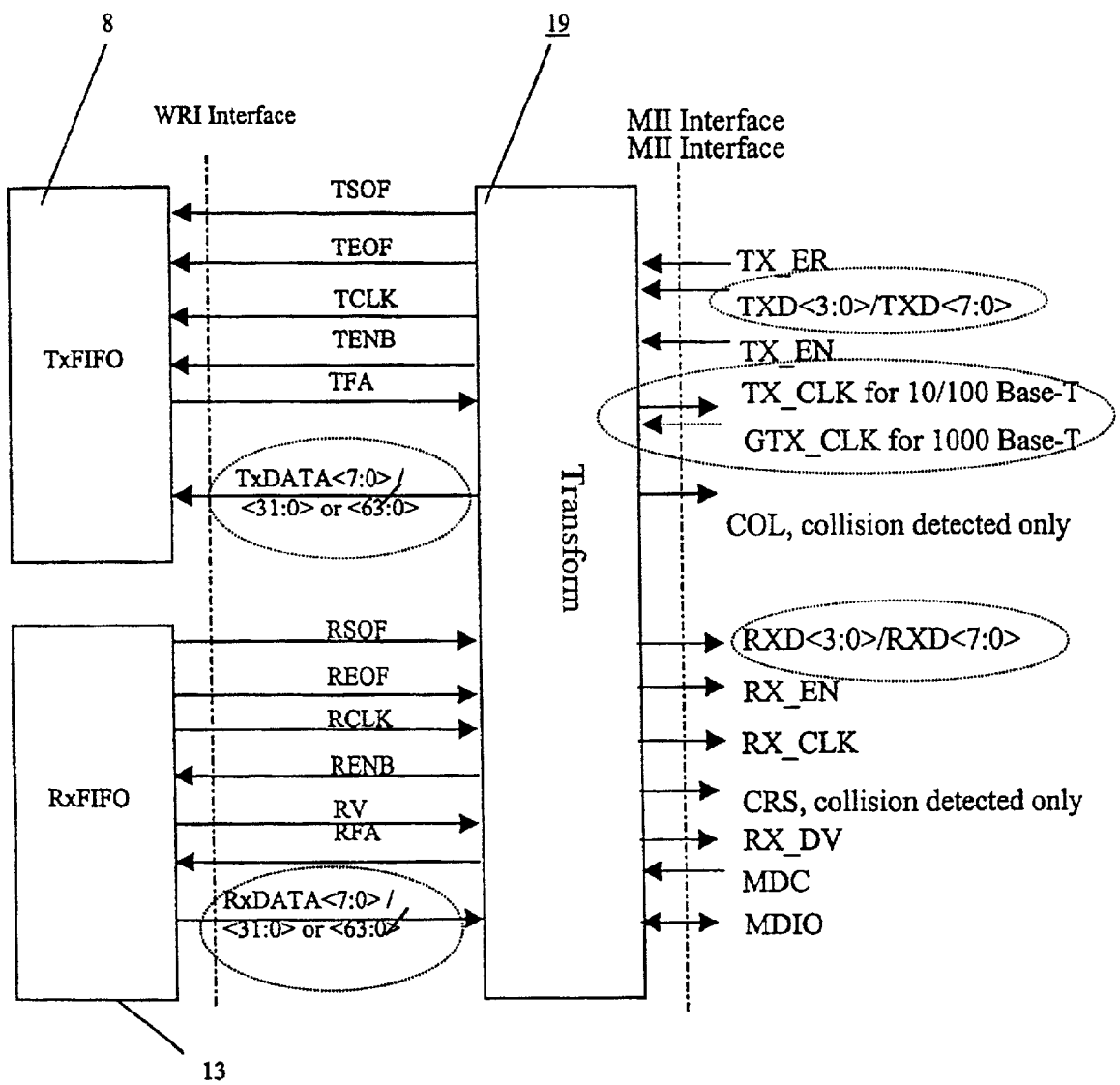
FIG. 13 shows a detailed block diagram of transformer 19 as shown in FIG. 9.

FIG. 13 shows a detailed block diagram of the transformer 19 as shown in FIG. 9. Following definitions are used in this case.

TX_ER: transmit coding error; TXD: transmit data; TX_EN: transmit enable; TX_CLK: transmit clock; GTX_CLK: Gigabit transmit clock; COL: collision detected; TXD: receive data RX_EN: reveive enable; RX_CLK: receive clock; CRS: Carrier sense; RX_DV: receive data valid; MDC: management data clock; MDIO: management data input/output; TSOF: transmit start of frame; TEOF: transmit end of frame; TCLK: transmit clock; TENA: transmit write enable; TFA: transmit frame available; TxDATA: transmit data; RSOF: receive start of frame; REOF: receive end of frame; RCLK: receive clock; RV: receive data valid; RFA: receive frame available; RxDATA: receive data It should be noted that the signal terms of the marked circle indicate an alternative. There are two choices. For Ethernet/Fast Ethernet over SDH/SONET application, TxDATA<7:0>(8×19.44 MHZ), RxDATA<7:0>(8×19.44 MHZ), TXD<3:0>(4×25 MHZ), RXD<3:0>(4×25 MHZ) and TX_CLK(25 MHZ) are used. For Gigabit Ethernet over SDH/SONET application, TxDATA<31:0>(32×78.76 MHZ)/<63:0>(64×38.88 MHZ), RxDATA<31:0>(32×78.76 MHZ)/<63:0>(64×38.88 MHZ), TXD<7:0>(8×125 MHZ), RXD<7:0>(8×125 MHZ) and GTX_CLK(125 MHZ) are applied, including the direction of GTX_CLK.

As shown in FIG. 13, the transformer 19 performs the transform function between MII/GMII interface and WRI interface.

1. The Synchronization of Transform Block Between Input and Output

The MII and GMII are compliant with IEEE 802.3 serious specifications. TX_CLK (Transmit Clock) or GTX_CLK (Gigabit Transmit Clock) is a continuous clock that provides the timing reference for the transfer of the TX_EN, TXD and TX_ER. RX_CLK (Transmit Clock or Gigabit Transmit Clock) is a continuous clock that provides the timing reference for the transfer of the TX_DV, RXD and RX_ER. The behavior of the COL (Collision detected) signal and CRS (Carrier sense) signal is unspecified when the Auto-Negotiation process selects a full-duplex mode of operation.

In transmit direction of EOS apparatus, MII/GMII and WRI interface are input and output respectively, and in receive direction, MII/GMII and WRI interface are output and input respectively. The WRI Interface provides transmit and receive data transfers in the parallel way of either 8 bits×19.44 MHZ at STM-1/OC-3c rate or 32 bits×78.76 MHZ/64bits×38.88 MHZ at STM-16/OC-48c rate at clock rates independent of the line speed. The EOS Chips can support frame rate decoupling by using FIFOs between the transformer and LAPS processor.

To ease the interface between the MII/GMII Layer and EOS apparatus and to support multiple PHY layer interfaces, the transformer 19 and FIFOs are used. Control signals are provided to support both the MII/GMII Layer and EOS layer devices to allow the EOS to exercise flow control at the WRI interface. Since the bus interface is a point-to-point based connections, the receive interface of the EOS apparatus pushes data to the MII/GMII Layer device through FIFOs and the transformer 19. At the transmit and receive interface, the frame available status granularity is octet-based. In the receive direction, when the EOS layer device has stored an end-of-frame (a small LAPS frame or the end of a larger LAPS frame) or some predefined number of bytes in its receive FIFO, it sends the in-band address followed by FIFO data to the MII/GMII Layer device through the transformer 19. The data on the WRI interface bus is marked with the receive valid signal (RV) asserted.

A multi-port EOS apparatus with multiple FIFOs would service each port in a round-robin fashion when sufficient data is available in its FIFO. The WRI interface can pause the data flow by deasserting the enable signal (RENB) according to IEEE 802.3x and the associated the transformer 19. In the transmit direction, when the EOS layer device has space for some predefined number of bytes in its transmit FIFO, it informs the MII/GMII Layer device through the transformer 19 by asserting a transmit frame available (TFA). The MII/GMII Layer device can then write the in-band address followed by frame data to the EOS layer device using an enable signal (TENB) at the WRI interface. The transformer 19 shall monitor TFA for a high to low transition, which would indicate that the transmit FIFO is near full (the number of bytes left in the FIFO can be user selectable, but must be predefined), and suspend data transfer to avoid an overflow. The transformer 19 can pause the data flow by deasserting the enable signal (TENB). The WRI-PHY defines frame-level transfer control in the transmit direction. Since the variable size nature of frames does not allow any guarantee as to the number of bytes available, in both transmit and receive directions, a selected EOS transmit frame available is provided on signal STFA and a receive data valid on signal RV. STFA and RV always reflect the status of the selected EOS to or from which data is being transferred. RV indicates if valid data is available on the receive data bus and is defined such that data transfers can be aligned with frame boundaries. Physical layer port selection is performed using in-band addressing. In the transmit direction, the MII/GMII device selects a EOS port by sending the address on the TxDATA<7:0> or TxDATA<31:0>/TxDATA<63:0> bus marked with the TSX signal active and TENB signal inactive. All subsequent TxDATA<7:0> or TxDATA<31:0>/TxDATA<63:0> bus operations marked with the TENB active will be frame data for the specified port. In the receive direction, the MII/GMII device will specify the selected port by sending the address on the RxDATA<7:0> or RxDATA<31:0>/RxDATA<63:0> bus marked with the RSX signal active and RV signal inactive. All subsequent RxDATA<7:0> or RxDATA<31:0>/RxDATA<63:0> bus operations marked with RV active will be frame data from the specified port.

In order to support the current small number multi-port EOS layer devices and future higher density multi-port devices. When the number of ports in the EOS layer device has limitation, byte-level transfer using DTFA signals provides a simpler implementation and reduces the need for addressing pins. In this case, direct access will start to become unreasonable as the number of ports increase. Frame-level transfer provides a lower pin count solution using the TADR bus when the number of ports is large. In-band addressing ensures the protocol remains consistent between the two approaches. However, the final choice left to the system designers and physical layer device manufacturers to select which approach best suits their desired applications.

2. Data Structures Around the Transformer 19

Frames shall be written into the transmit FIFO and read from the receive FIFO using a defined data structure. Octets are written in the same order they are to be transmitted or they were received on the SDH/SONET line. Within an octet, the MSB (bit 7) is the first bit to be transmitted (refer to FIG. 7/X.86 of ITU-T Draft Recommendation X.86. The EOS apparatus may use the transfer of 1-byte frames. In this case, both start of frame and end of frame signals shall be asserted simultaneously. For frames longer than the EOS apparatus FIFO, the frame must be transferred over the WRI interface. The number of bytes of each frame data in each section may be fixed or variable depending on the application. The MII/GMII may send fixed size sections of frames through the transformer 19 on the MII/GMII Interface or use the TFA signal to determine when the FIFO reaches a full level on WRI interface. For Multi-MII/GMII port application, TPAS (Transmit Port Address Selection) indicates when the in-band port address selection is valid on the TxDATA bus. When TPAS is high and TENB is high, the value of TxDATA[7:0] or TxDATA<31:0>/TxDATA<63:0> is the address of the transmit FIFO to be selected. Subsequent data transfers on the TxDATA bus will fill the FIFO specified by this in-band address. For single port EOS apparatus, the TPAS signal is optional as the EOS apparatus will ignore in-band addresses when TENB is high. TPAS is considered valid only when TENB is not asserted.

In 32-bit/64 bit bus interface and 8-bit bus interface, the in-band port address for multi-port EOS apparatus is not shown here. The transformer 19 would send the MII/GMII port address, on the same bus as the data, marked with the TPAS signal active and the TENB signal inactive. Subsequent data transfers on the WRI Interface would use the transmit FIFO selected by the in-band address. On the Receive Interface, the EOS apparatus reports the receive FIFO address in-band with the RPAS (Receive Port Address Selection) signal active and the RV signal inactive before transferring frame data. For both cases, large frames which exceed the FIFO size will be transferred over the WRI interface with appropriate in-band addressing prefixing each section.

The in-band address is specified in a single clock cycle operation marked with the TPAS/RPAS signals. The port address is specified by the TxDATA[7:0] and RxDATA[7:0] signals or TxDATA[31:0]/TxDATA[63:0] and RxDATA[31:0]/RxDATA[63:0] signals. The address is the numeric value of the TxDATA[7:0] and RxDATA[7:0] signals or TxDATA[31:0]/TxDATA[63:0] and RxDATA[31:0]/RxDATA[63:0] signals in the way of number coding where bit 0 is the least significant bit and bit 7 is the most significant bit. Thus, up to 256 ports may be supported by a single interface. With a 32-bit interface, the upper 24 bits shall be ignored, and with 64-bit interface, the upper 56 bits shall be ignored.

According to ITU-T draft Recommendation, a Frame Check Sequence (FCS) must be Processed in LAPS processor. If the EOS apparatus does not insert the FCS field before Transmission as an optional way, these bytes should be included at the end of the packet. If the EOS apparatus does not strip the FCS field in the receive direction, these bytes will be reserved at the end of the packet.

Management Control Interface

Below describes the Management control Interface to the EOS apparatus and defines the address of all registers that are available for reading or writing by an external microprocessor. A table containing the Common Configuration and Summary Status Map, which holds control and monitoring parameters that are common to the entire device, is used here. This table is the management control interface register map for the Transmit Side, and each block is the Management Control Interface register maps for the Receive Side. The MSB of the microprocessor bus address, ADDR [8:0], designates whether the map is associated with the Transmit or Receive direction. ADDR[7:0] indicate the specific map and these values are identified with the following detailed descriptions of each map. The Common Configuration and Status Map is has ADDR[8] =0.

1. Interrupt or Polled Operation

The Management Control Interface can be operated in either an interrupt driven or a polled mode. In both modes, the EOS apparatus register bit SUM_INT in address 0x002 of the Common Configuration and Summary Status Map can be used to determine whether or not changes have occurred in the state of monitoring registers in the EOS apparatus.

1.1 Interrupt Sources 1.1.1 Transmit Side

The Transmit Side register maps are almost entirely provisioning parameters that determine the composition of the SONET/SDH signal and provide the LAPS, SONET/SDH POH, and SONET/SDH TOH/SOH values. In addition to these provisioning parameters, the Transmit Side register map includes System Interface and General Purpose I/O monitors. If any of these indications are active, the SUM_INT bit in register 0x002 will be high (logic 1). If SUM_INT_MASK=0, the interrupt output for the microprocessor interface, INTB, becomes active (logic 0).

1.1.2 Receive Side

The table also contains summary status bits for the Receive Side in register 0x005. These bits contribute to the SUM_INT bit in register 0x002. If any of the summary status bits is "1" and the corresponding mask bit is "0", then the SUM_INT bit will be set to "1". The summary status bits in registers 0x005 of Table (TBD) are "1" if one or more of the corresponding group of bits in Table (TBD) is "1". Individual TOH/SOH delta and second event bits can be masked (Table (TBD), addresses 0x204–0x206, for example).

1.2 Interrupt Driven

In an interrupt driven mode, the SUM_INT_MASK bit in register 0x006 of the Common Configuration and Summary Status Map should be cleared (to logic 0). This allows the INTB output to become active (logic 0). This output is INTB=!(!SUM_INT_MASK && SUM_INT) In addition, the MII_RX_APS_INT_MASK bits of the Receive side should be cleared (to logic 0). This allows the APS_INTB output to become active (logic 0). This output is APS_INTB=!(! MII_RX_APS_INT_MASK && MII_RX_APS_INT). If an interrupt occurs, the microprocessor can first read the summary status registers, 0x004–0x005 to determine the class(es) of interrupt source(s) that is active, and then read the specific registers in that class(es) to determine the exact cause of the interrupt.

1.3 Polled Mode

In a polled Mode, the SUM_INT_MASK and MII_RX_APS_INT_MASK bits should be set (to logic 1), to suppress all hardware interrupts and operate in a polled mode. In this mode, the EOS apparatus 1 outputs INTB and APS_INTB are held in the inactive (logic 1) state.

It should be noted that the SUM_INT_MASK and MII_RX_APS_INT_MASK bits do not affect the state of the register bits SUM_INT and MII_RX_APS_INT. These bits can be polled to determine if further register interrogation is needed.

Microprocessor Interface

The Microprocessor Interface 18 to the EOS apparatus enables the System to access all registers within the EOS apparatus. The Microprocessor Interface is capable of operating in either an interrupt driven or a polled mode. In the interrupt mode, the EOS apparatus is capable of supporting multiple Interrupt Sources. The EOS apparatus is capable of masking out any of the interrupts in either Interrupt modes.

Since the other section of the EOS apparatus of the invention is well-known in the art, the description associated with them is omitted here.

Following are some advantages from EOS implementation of the second embodiment of the invention to that of the first embodiment.

(1) Latency Variance

By computation, it will be fount that: Ethernet MAC—15 μs, Rate Adaptation Buffer—15 μs, LAPS mapping Buffer—15 μs, LAPS CRC Buffer—15 μs, so the total Latency Variance is 60 μs. It is much lower than 1 millisecond and its result could meet the requirement of the real-time service transmission.

Figure 19:
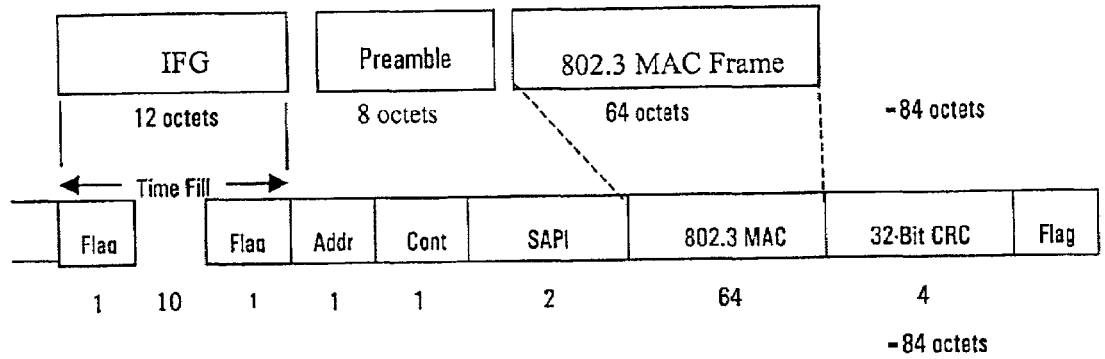
FIG. 19 shows the full matching behaviour between Inter-Frame Gap (IFP)/Frame of IEEE802.3 and the LAPS frame.

(2) The full matching behaviour between Inter-Frame Gap (IFP)/Frame of IEEE802.3 and the LAPS frame as shown in FIG. 19.

The octets sum of IFG, Preamble and SFD (Start Frame Delimiter) of IEEE 802.3 is always 20 octets. For the minimum frame of IEEE802.3, the size is 64 octets. When IFG (12 octets) occurs, it will be discarded silently and Time Fill (12 octets totally) will replace IFG by this EOS (Ethernet over SDH/SONET) solution: By using 4 octets (including Address field, Control field and 2-octet SAPI field) solution to replace 2 octets (including a single octet SAPI and Control) solution, both total octets will equal 84 octets. This means the LAPS frame does fully matched with IEEE 802.3 frame.

(3) The EOS apparatus when a carrier would like to provide a private Ethernet or Gigabit Ethernet service to its customer (Internet Service Provide, for example), is shown as following:

a. Remote Trail Performance Monitoring using B1/B2/B3 Bytes
b. Remote Fault Indication
c. IEEE802.3x—Active Flow Control in Burst Traffic Condition
d. Reliable service by using 1+1 redundancy of SDH/SONET based
e. Low Latency and Low Latency Variance
f. Use of virtual concatenation and byte interleaving since the various "common" data rates (Ethernet/Gigabit Ethernet) are not compatible to SONET/SDH transport rates (4) LAPS of the first embodiment and the second embodiment appear to be complimentary and consistent with each other. It is desirable to have LAPS identify higher-layer packets by the first four bytes rather than just the first two. Reusing the PPP protocol identifiers for LAPS, and hence matching PPP's on-the-wire packet format, has the advantage that should LAPS at some later time need to define L2 signalling, LAPS could incorporate PPP signalling by reference without having to obsolete or change LAPS itself in any way. For example, using LAPS is for some things, and PPP for others. The 2001 version of LAPS would appear to be a more flexible selection. Vendors implementing both LAPS and PPP would be required to examine the first 4 bytes anyway and it would be better to have LAPS do the same so that vendors are not led to believe that identifying packets by the first two bytes is sufficient.

(5) Regarding LAPS frame format, information field is Ipv4 or Ipv6 datagram which is 32-bit based. It is good for implementation, especially for high-speed data processing if the total overhead of LAPS, including address field (single octet), control field (single octet), SAPI field (two octets) and FCS field (four octets), is also 32-bit based.

(6) The change from 2-byte sequence to 4-byte sequence has been made according to the second embodiment of the invention. So <04 03 00 21> and <04 03 00 57> indicate that Ipv4 and Ipv6 are encapsulated respectively. There should not be any confusion between the use of PPP or LAPS and LAPS SAPI because the SDH VC-4 signal label (C2 byte) had been specified for PPP or LAPS in ITU-T SG15 and make the distinction.

(7) Regarding FCS field, the implementation of the second embodiment avoids any confusion, that is the least significant FCS byte (the coefficient of the highest term) is the first inserted/transmitted FCS byte located just after the Last Information field byte. The CRC calculator is fed with the least significant (last transmitted) bit order per byte. The transmitted bits are scrambled in the order they are transmitted.

Having described the invention in connection with SDH/SONET, however, it is possible for the invention to be applied to simplified SDH/SONET. The simplified SDH/SONET is a simplification of the SDH/SONET in which some of the POH could be aborted to reduce the loads of the processor.

Figure 14:
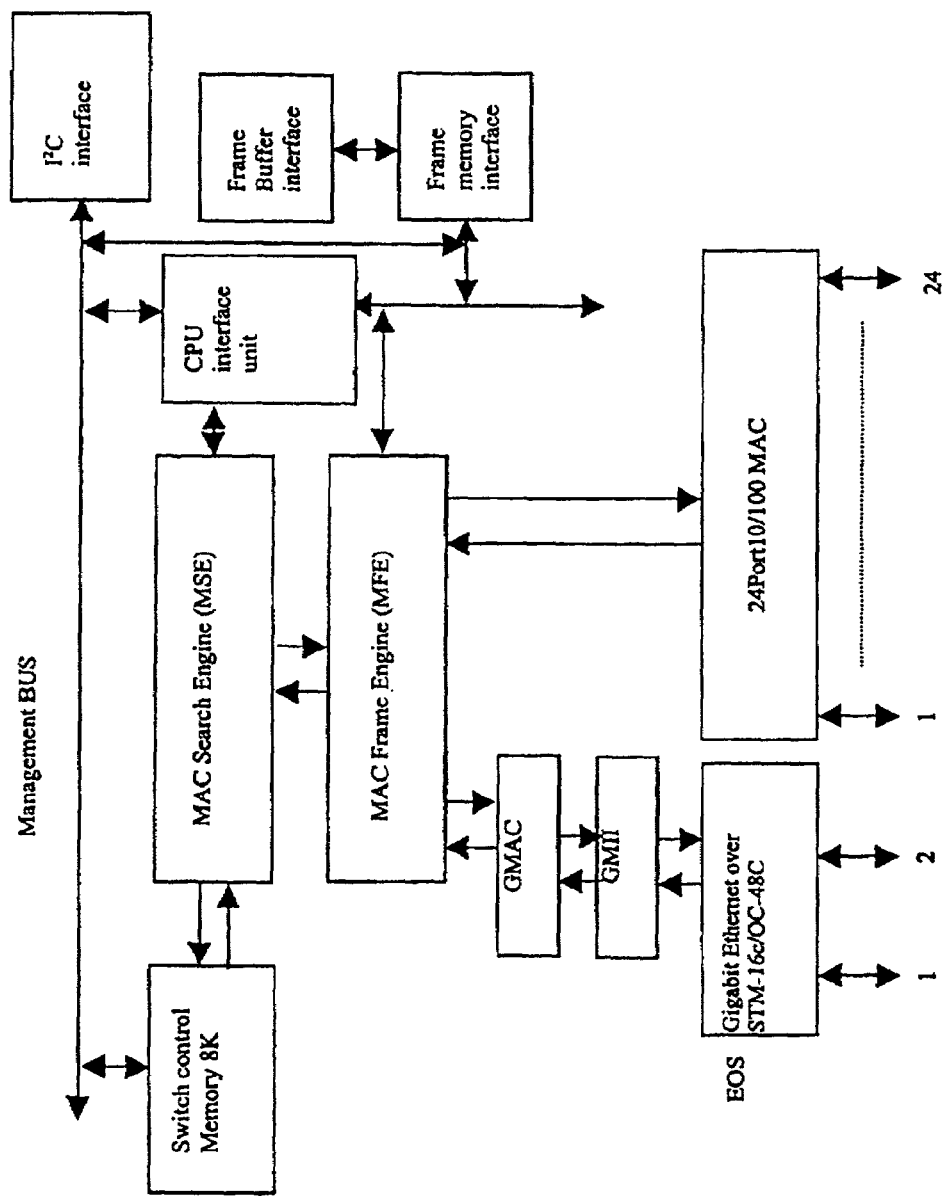
FIG. 14 is an exemplary schematic diagram illustrating L2 Ethernet switch with the two EOS ports.

FIG. 14 is an exemplary diagram showing the SDH private network connection for the Layer 2 switch of 10 BASE-T and 100 BASE-T, 1000 BASE-x switch with EOS apparatus according to an embodiment of the invention (named as S24-2OC-48).

The following definitions are used in the figures: GMAC: Gigabit Media Access Control; GMII: Gigabit Media independent Interface; MAC: Media Access Control Switch control Memory: used to read and write data during switch phase; I$^2$C interface: used to provide E$^2$PROM interface; CPU interface unit: used to provide facility to interface to the external host of micro-computer; Frame Buffer: used to store data in the way of high speed; Frame Memory: used to store data in the normal way; Gigabit Ethernet over STM-16c/OC-48C: is EOS unit which provides two Gigabit Ethernet mapping to.

A single OC-48c/STM-16c according to diagram of FIG. 9 shown a single GMII channel. 24Port10/100 MAC is used to provide twenty four MAC ports handling. The MAC Frame Engine (MFE) is a primary MAC frame buffering and forwarding engine within S24-2GEOC48. The MAC Search Engine (MSE) is used to provide destination address search function.

The basic features of S24-2GEOC48 are follows:
Two Gigabit Ethernet port over STM-16c/OC-48c
24 10/100 Mbps Autosensing, Fast Ethernet Ports with MII Interface
Supports IEEE 802.1d Spanning Tree Algorithm
Layer 2 Switching Internal Switch Database Memory supports up to 2k MAC addresses, up to 64k CPU memory for SNMP Network Management, Web-based Network Management Console interface or RS-232 local Console interface or parallel interface.

Supports up to 16k MAC addresses in a 24+2(EOS) system
Supports IP Multicasting through IGMP Snooping
High-speed MAC frame Forwarding with more than 3M MAC frames per second (Mpps)and Filtering at Full-Wire Speed
Supports more than 6 Mpps system throughput using True Non-Blocking Architecture
Single Store and Forward at Ingress Port and Cut-Through
Switching at Destination Ports
Very low latency through single store and forward switching technique
Full Duplex Ethernet IEEE 802.3x Flow Control Minimizes Traffic Congestion
Backpressure Flow Control (IEEE802.3x) For Half Duplex Ports
Provides port and ID tagged Virtual LAN (VLAN) 802.1Q
VLAN ID Tagging Insertion/Extraction
Supports IEEE 802.1p/Q Quality of Service with 4 Priority Transmission Queues, Weighted Fair Queuing, and user mapping of priority levels and weights
Supports Ethernet Multicasting and Broadcasting
Provides Source, Destination, and Protocol Filtering
Serious EEPROM provides the protection of configuration data.

The S24-2GEOC48 is a 26-port 10/100/1000 Mbps (with gigabit Ethernet over STM-16c/OC-48c) non-blocking Ethernet switch chip with on-chip address memory. The on-chip address memory supports up to 2K MAC addresses and up to 256 IEEE 802.1Q Virtual LANs (VLANs). The S24-2GEOC48 supports port trunking/load sharing on the 10/100 Mbps ports. The port trunking/load sharing could be used to group ports between interlinked switches to increase the effective network bandwidth. The Frame Buffer Memory interface utilizes cost effective, high-performance pipelined synchronous burst SRAM to support full wire speed on all external ports simultaneously. In half-duplex mode, all ports support back pressure flow control, to minimize the risk of losing data for long activity bursts. In full-duplex mode, IEEE 802.3x flow control is provided. With full-duplex capabilities, ports 0-11 support 200 Mbps aggregate bandwidth connections and port 12 supports 2 Gbps to desktops, servers, or other high-performance switches. Statistical information for Etherstat SNMP and Remote Monitoring Management Information Base (RMON MIB) are collected independently for each of the 26 ports. Access to these statistical counter/registers is provided via the CPU interface. SNMP Management frames can be received and transmitted via the CPU interface, creating a complete network management solution. The S24-2GEOC48 is fabricated using 0.18 mm technology. Inputs are 3.3V tolerant and the outputs are capable of directly interfacing to LVTTL levels.

As shown in the figure, the EOS apparatus of the invention is built into the 10M/100M/1000M L2 LAN switches in the case of communication between the switches and transmission device (e.g. ADM).

Twenty-four10/100 Media Access Controllers (MAC) provide the protocol interface into S24-2GEOC48. These MACs perform the required MAC frame checks to ensure that each MAC frame that is provided to the MAC Frame Engine has met all the IEEE 802.3 standards. Data MAC frames longer than 1518 (1522 with VLAN tag) bytes and shorter than 64 bytes are dropped, and VHS108 has been designed to support minimum interframe gaps between incoming MAC frames.

The MAC Frame Engine (MFE) is the primary MAC frame buffering and forwarding engine within S24-2GEOC48. As such, the MFE controls the storage of MAC frames into and out of the external frame memory buffer, keeps track of frame buffer availability, and scheduling of output MAC frame transmission. While MAC frame data is being buffered, the MFE extracts the necessary information from each MAC frame header and sends it to the search engine for processing. Search results passed back to the MFE result in the scheduling of MAC frame transmission and prioritization. When a MAC frame is chosen for transmission, the MFE reads the MAC frame from external buffer memory and places it in the output FIFO of the output port.

The MFE can manage the output transmission queues for all ports of S24-2GEOC48. Once the destination address search is complete in the MSE, and the switch decision is passed back to the MFE, the MAC frame is inserted into an appropriate output queue. The frame entry into the high or low priority queue is controlled by either the VLAN priority tag information or the Type of Service/Differentiated Service (TOS/DS) field in the IP header. The configuration register can determine whether VLAN priority tag or TOS/DS field is used for QoS mapping. While using VLAN priority tag for QoS mapping, the user can also map the transmission priority by the register VLAN Priority Map method and assign the dropping precedence by the register VLAN Discard Map register, While the system uses TOS/DS coding point field to map QoS, it can select either TOS byte (refer to RFC 791) or the bit[3:5] of TOS byte (refer to RFC 2460 and some RFC documents on IETF web site) to map the transmission queue priority as well as a frame drop precedence. User can control the selected TOS mapping field. The mapping of TOS fields to either the high or low priority queue is handled by the registers TOS Priority Map, and TOS Discard Map. S24-2GEOC48 uses Weighted Round Robin (WRR) and Weighted Random Early Detection/Drop (WRED) to schedule frames for transmission. To enable S24-2GEOC48 QoS capabilities requires the use of an external EEPROM (4 Kbytes) to change the default register configurations and turn on QoS.

S24-2GEOC48 is able to begin address learning and MAC frame forwarding shortly after power-up is completed. The MAC search engine (MSE) examines the contents of its internal Switch Database Memory for each valid MAC frame that is received on a S24-2GEOC48 input port. Unknown source and destination MAC addresses are detected when the MSE does not find a match within its database. These unknown source MAC addresses are learned by creating a new entry in the switch database memory, and storing the necessary resolution information in that location. Subsequent searches to a learned destination MAC address will return the new contents of that MAC Address Control Table (MACT) entry. After each source address search the MACT entry aging flag is updated. MACT entries that have not been accessed during a user configurable time period (from 5 to 7200 seconds) will be removed. This aging time period can be configured using the 16-bit value stored in the registers MAC Address Aging Time Low and High. The aging of all MACT entries is checked once during each time period. If the MACT entry has not been used before the end of the next time period, it shall be deleted.

S24-2GEOC48 supports a isolate Mode, where each port of port0–23 only allow to directly communicate with the uplink port of OC-48 eased. Therefore, this mode ensures that data from one port of port 0–23 cannot be directly seen by another port. This feature usually is desired in Home accessing ISP(Internet Service Provide) application to deliver data privacy for subscribers.

S24-2GEOC48 uses a standard serious port interface to provide external host access to the internal Registers as shown Management Bus in FIG. 14. This serious interface is composed of 3 pins: TRANSMIT DATA; RECEIVE DATA; and GROUNG. The TRANSMIT DATA and RECEIVE DATA pin provide the address and data content input to S24-2GEOC48, A simple 2 wire serial interface is provided to allow the configuration of S24-2GEOC48 from an external EEPROM. VHS108 utilizes a 4K bit EEPROM with an $I^2C$ interface.

The another example to support EOS application is that, the system vendors can build a little box which provides Ethernet port connected to 10/100/1000M Ethernet switch, and OC-3/STM-1 or OC-48/STM-16 connected to SDH/SONET transmission system. At the another side, the inverse transform will be used.

Figure 15:
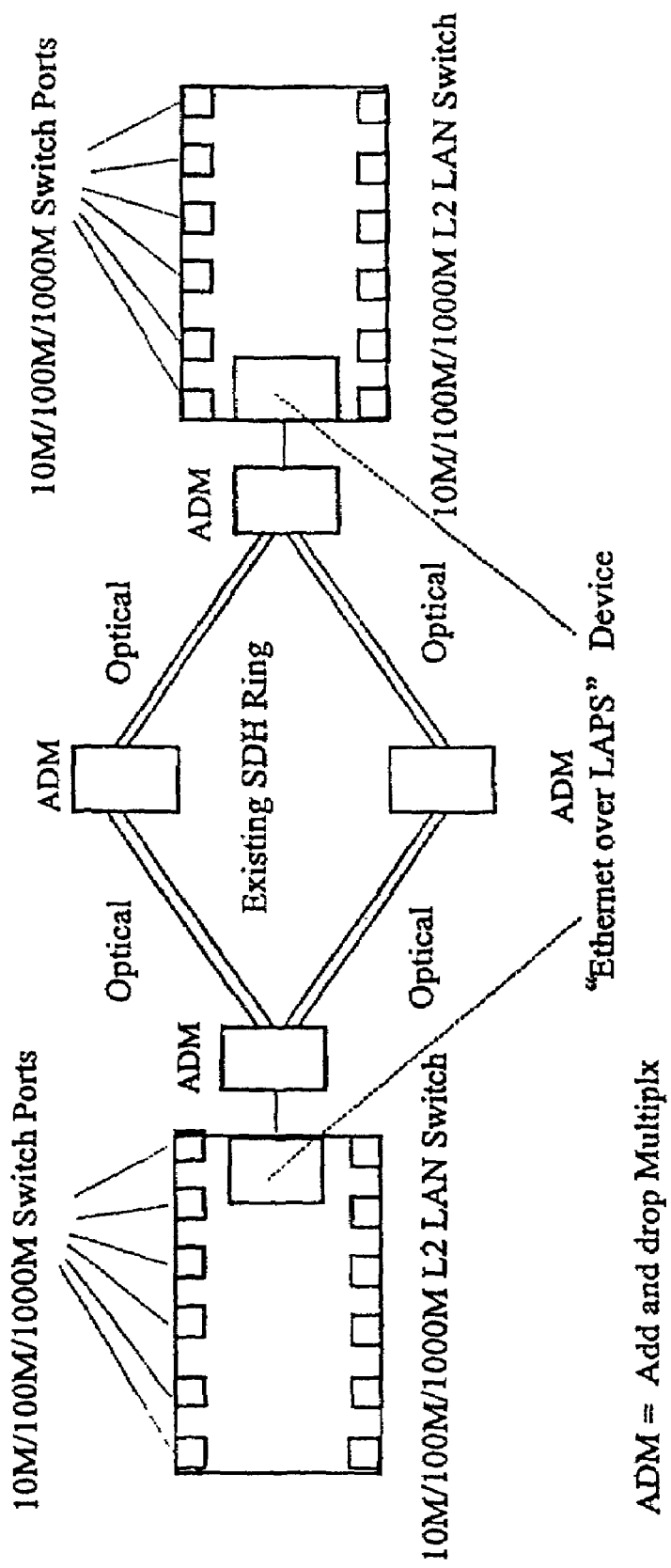
FIG. 15 is an exemplary diagram showing the SDH private network connection for the Layer 2 switch of 10 BASE-T and 100 BASE-T, 1000 BASE-x switch with EOS apparatus according to an embodiment of the invention.

FIG. 15 is an exemplary diagram showing the SDH private network connection for the Layer 2 switch of 10 BASE-T and 100 BASE-T, 1000 BASE-x switch with EOS apparatus according to an embodiment of the invention. As shown in the figure, the EOS apparatus of the invention is built into the 10M/100M/1000M L2 LAN switches in the case of communication between the switches and transmission device (e.g. ADM).

Figure 16:
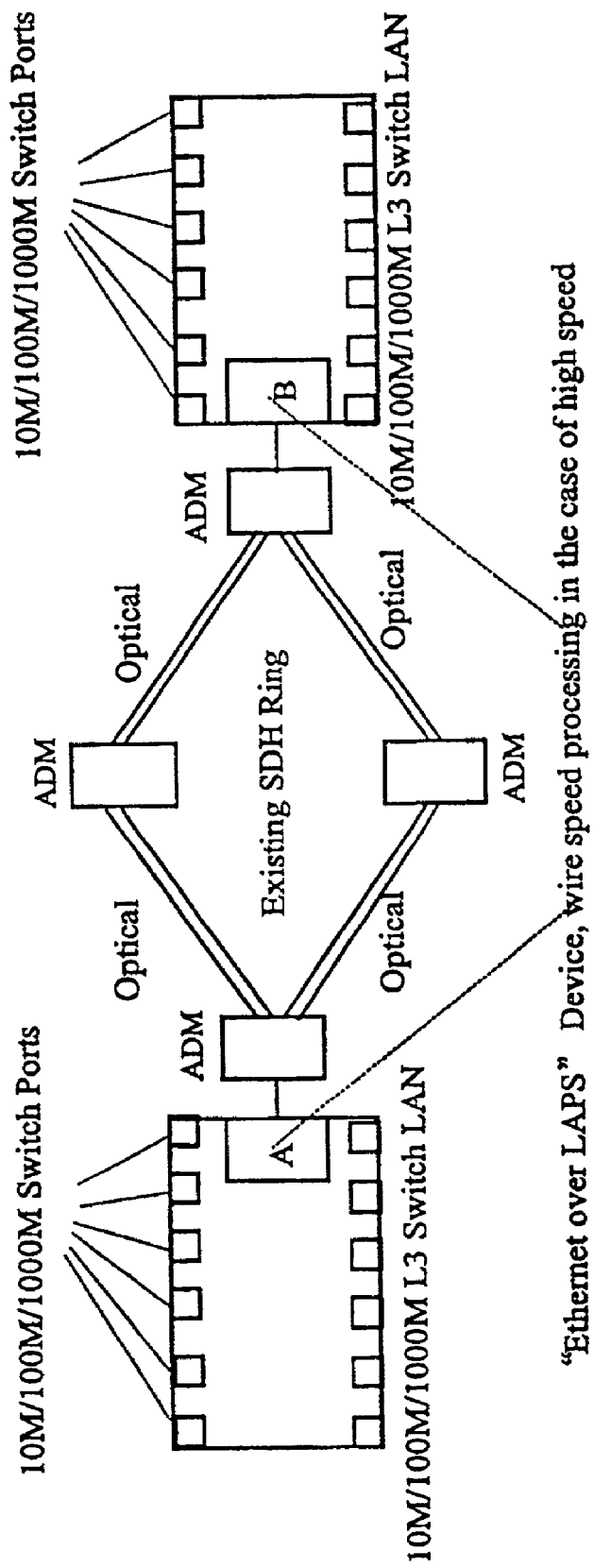
FIG. 16 is an exemplary diagram showing the SDH public network connection with Layer 3 switches with IEEE 802.3 Ethernet according to another embodiment of the invention.

FIG. 16 is an exemplary diagram showing the SDH public network connection with Layer 3 switches with IEEE 802.3 Ethernet according to another embodiment of the invention. As shown in the figure, the EOS apparatus is built into the 10M/100M/1000M L3 switch LAN in the case of high speed communication to perform wire speed processing between the switches and transmission device (e.g. ADM).

As for the cases shown in the FIGS. 15 and 16, the EOS apparatus according to the invention could be alternatively built into the transmission device (e.g. ADM). By implementing such a network architecture, the invention bring out a benefit of providing Ethernet interface on the transmission device. Such a network architecture could extend the transmission distance of Ethernet, broaden the application scope of the transmission device to access and transmission, and apply to DWDM in the case of simplified SDH/SONET, and combine Ethernet with SHD/SONET without ATM.

Alternatively, it is also a practical way to connect the EOS apparatus according to the invention between transmission devices and LAN switches to provide a point-to-point full-duplex simultaneous bi-direction operation in order to provide Ethernet over a Wide Area Network.

In addition, with the concatenating of VCs of SDH/SONET, Ethernet frames could be encapsulated and transmitted together with MPEG frames as well as audio frames etc. Also, by adjusting the pointers in the VCs, synchronization between transmission side and receiving side which are apart away from each other for a long distance could be easily achieved.

INDUSTRIAL APPLICABILITY

It could be seen from above description in connection with the accompanied figures, the present invention discloses a novel interfacing apparatus and method for adapting Ethernet directly to physical channel. The invention provides Ethernet interface in telecom SDH/SONET transmission device or provides facilities to remote access datacom device, such as core and edge routers, switch devices, IP based network accessing equipment, line cards, and interfacing units used in high speed, e.g. adapting MAC frame directly to SDH/SONET. By simplification of SDH/SONET, i.e. using simplified SDH/SONET, Ethernet could be applied to DWDM.

Having described in detail the various aspects of the present invention described above, it is understood that modifications to the illustrative embodiments will readily occur to those skilled in the art having had the benefit of the present disclosure. All such modifications and variations are deemed to be within the scope and spirit of the present invention as defined by the accompanying claims to the invention.

The invention claimed is:

1. A data transmission apparatus for transmitting data packets from an upper layer side device to a lower layer side device, comprising:
   a first receiving means for receiving the data packets from said upper layer side device, and converting said data packets to a first type of frames;
   a first processing means for encapsulating said first type of frames to form a second type of frames containing a SAPI field including a SAPI identifier and an information field including said data packets;
   a second processing means for encapsulating said second type of frames into a payload portion, inserting appropriate overheads corresponding to said data packets, so as to form a third type of frames; and
   a first transmitting means for outputting said third type of frames to said lower layer side device,
   wherein said upper layer is Ethernet MAC layer, said first type of frames are MAC frames, said second type of frames are LAPS frames, and the third type of frames are SDH/SONET frames.

2. The data transmission apparatus according to claim 1, wherein said first processing means encapsulates said first type of frames into a format of start flag, SAPI field including SAPI identifier as address field, control field, information field including said data packets, FCS field, and end flag, to form a second type of frames.

3. The data transmission apparatus according to claim 2, wherein said SAPI field is of one single octet, and said control field is of one single octet.

4. The data transmission apparatus according to claim 1, wherein said first processing means encapsulates said first type of frames into a format of start flag, address field, control field, SAPI field including said SAPI identifier, information field including said data packets, FCS field, and end flag, to form a second type of frames.

5. The data transmission apparatus according to claim 4, wherein said address field is of one single octet, said control field is of one single octet, and said SAPI field is of two octets.

6. The data transmission apparatus according to claim 3, wherein said first receiving means is a first FIFO for receiving and buffering the input data packets, and adapting the rate of said upper layer side device to the rate of said lower layer side device.

7. The data transmission apparatus according to claim 6, further comprising a scrambling means for performing scrambling to said second type of frames with a frame synchronous scrambling sequence generated from a polynomial $g(x)=x^{43}+1$.

8. The data transmission apparatus according to claim 7, further comprising a pointer processing means for inserting pointer which indicates the start position of the payload portion in said third type of frames.

9. The data transmission apparatus according to claim 8, further comprises a framing means for encapsulating the scrambled second type of frames into said third type of frames.

10. The data transmission apparatus according to claim 9, wherein said start flag and end flag of the second type of frames are "0x7E", and said 0x7E shall be transmitted during inter-frame time fill.

11. The data transmission apparatus according to claim 10, wherein said first processing means performs transparency processing (octet stuffing).

12. The data transmission apparatus according to claim 11, wherein said first processing means calculates 32 bit frame check sequence field over all octets within the frame except the start flag and the end flag and the FCS field itself, with generating polynomial: $1+x+x^2+x^4+x^5+x^7+x^8+x^{10}+x^{11}+x^{12}+x^{16}+x^{22}+x^{23}+x^{26}+x^{32}$.

13. The data transmission apparatus according to claim 12, wherein said payload portion includes one sub-portion or more than one sub-portions of payload for carrying said first type of frames.

14. The data transmission apparatus according to claim 1, wherein said first processing obtains the SAPI from said first receiving means.

15. The data transmission apparatus according to claim 3, wherein the end flag of a previous second type of frame is the start flag of a subsequent second type of frame.

16. The data transmission apparatus according to claim 1, further comprising a line side packet loopback means for loopbacking the first type of frames extracted from the second frames into said first processing means for test purpose.

17. The data transmission apparatus according to claim 13, wherein said payload portion is a virtual container or contiguous and virtual concatenation of virtual containers, and virtual containers as the sub-portions of payload.

18. The data transmission apparatus according to claim 1, wherein said overheads include Path Trace(J1), path BIP-8 (B3), signal label(C2) Path status(G1) in a way of single virtual container or concatenation.

19. The data transmission apparatus according to claim 1, wherein said physical layer is SDH/SONET or simplified SDH/SONET.

20. The data transmission apparatus according to claim 1, wherein said data transmission apparatus is built in a SDH/SONET transmission device.

21. The data transmission apparatus according to claim 1, wherein said data transmission apparatus is built in an Ethernet switch device.

22. The data transmission apparatus according to claim 1, wherein said data transmission apparatus is an Ethernet switch device or an Ethernet/Fast Ethernet/Gigabit Ethernet L2/L3 switch or associated router.

23. The data transmission apparatus according to claim 22, wherein said Ethernet switch device is an Ethernet/Fast Ethernet/Gigabit Ethernet L2/L3 switch or associated router.

24. The data transmission apparatus according to claim 19, wherein said data transmission apparatus maps the received MAC/GMAC frame from MII/GMII to the SDH/SONET block through transformer synchronously.

25. The data transmission apparatus according to claim 19, wherein said data transmission apparatus, for the purpose of rate adaptation, adds the programmable rate adaptation Gap fill byte (0xdd) into said second type of frames in a form of {0x7d, 0xdd} if necessary.

26. A data transmission method for transmitting data packets from an upper layer side device to a lower layer side device, comprising steps of:
   receiving and buffering the data packets from said upper layer side device, adapting the rate of said upper layer side device to the rate of said lower layer side device, and converting said data packets to a first type of frames;
   encapsulating said first type of frames to form a second type of frames containing a SAPI field including a SAPI identifier and an information field including said data packets;

encapsulating said second type of frames into a payload portion, inserting appropriate overheads corresponding to said data packets, so as to form a third type of frames; and outputting said third type of frames to said lower layer side device, wherein said upper layer is Ethernet MAC/GMAC layer, said first type of frames are MAC/GMAC frames, said second type of frames are LAPS frames, and the third type of frames are SDH/SONET frames.

27. The data transmission method according to claim 26, wherein said first type of frames are encapsulated into a format of start flag, SAPI field including SAPI identifier as address field, control field, information field including said data packets, FCS field, and end flag, to form a second type of frames.

28. The data transmission method according to claim 27, wherein said SAPI field is of one single octet, and said control field is of one single octet.

29. The data transmission method according to claim 26, wherein said first type of frames are encapsulated into a format of start flag, address field, control field, SAPI field including said SAPI identifier, information field including said data packets, FCS field, and end flag, to form a second type of frames.

30. The data transmission method according to claim 29, wherein said address field is of one single octet, said control field is of one single octet, and said SAPI field is of two octets.

31. The data transmission method according to claim 28, further comprising a step of performing scrambling to said second type of frames with a frame synchronous scrambling sequence generated from a polynomial $g(x)=x^{43}+1$.

32. The data transmission method according to claim 31, further comprising a step of inserting pointer which indicates the start position of the payload portion in said third type of frames.

33. The data transmission method according to claim 32, further comprises a step of encapsulating the scrambled second type of frames into said third type of frames.

34. The data transmission method according to claim 33, wherein said start flag and end flag are "0x7E", and said data transmission method further comprises a step of transparency processing (octet stuffing).

35. The data transmission method according to claim 34, further comprising a step of calculating 32 bit frame check sequence field over all octets within the frame except the start flag and the end flag and the FCS field itself, with generating polynomial: $1+x+x^2+x^4+x^5+x^7+x^8+x^{10}+x^{11}+x^{12}+x^{16}+x^{22}+x^{23}+x^{26}+x^{32}$.

36. The data transmission method according to claim 35, wherein said payload portion includes a plurality of sub-portions of payload for carrying said first type of frames.

37. The data transmission method according to claim 28, wherein the end flag of a previous frame is the start flag of a subsequent frame.

38. The data transmission method to claim 26, wherein said payload portion is a virtual container or contiguous and virtual concatenation of virtual containers, and virtual containers as the sub-portions of payload.

39. The data transmission method according to claim 26, wherein said overheads include Path Trace(J1), path BIP-8 (B3), signal label(C2) Path status(G1) in a way of single virtual container or concatenation.

40. The data transmission method according to claim 26, wherein said physical layer is SDH/SONET or simplified SDH/SONET.

41. The data transmission method according to claim 26, wherein said Ethernet layer is an Ethernet layer of IEEE 802.3/802.3u/802.3z.

42. The data transmission method according to claim 40, further comprises a step of synchronizing the received MAC/GMAC frame from MII/GMII to the SDH/SONET block through transformer.

43. The data transmission method according to claim 40, for the purpose of rate adaptation, further comprises a step of adding the programmable rate adaptation Gap fill byte (0xdd) into said second type of frames in a form of {0x7d, 0xdd}.

44. A data transmission apparatus for transmitting data packets formed by a first type of frames from a lower layer side device to an upper layer side device, comprising:

a second receiving means for receiving the data packets from said lower layer side device;

a de-framing means for removing the overheads of said first type of frames;

a third processing means for extracting a SAPI field and the data contained in the information field from the payload portion of said first type of frames, to form a second type of frames;

a determining means for comparing the value of the SAPI field with a preset value, and determining to output the extracted data as it be if the value of the SAPI field data equals to said preset value;

a fourth processing means for converting said second type of frames to a third type of frames corresponding to in said data packets; and a second transmitting means for transmitting the extracted data packets to said upper layer side device.

45. The data transmission apparatus according to claim 44, wherein each of said second type of frames including start flag, SAPI field, control field, information field, FCS field, and end flag.

46. The data transmission apparatus according to claim 45, wherein said SAPI field is of one single octet, and said control field is of one single octet.

47. The data transmission apparatus according to claim 44, wherein each of said second type of frames includes start flag, address field, control field, SAPI field including a SAPI identifier, information field including said data packets, FCS field, and end flag.

48. The data transmission apparatus according to claim 47, wherein said address field is of one single octet, said control field is of one single octet, and said SAPI field is of two octets.

49. The data transmission apparatus according to claim 44, wherein said second transmitting means is a second FIFO for receiving and buffering the input data packets, and adapting the rate of said lower layer side device to the rate of said upper layer side device.

50. The data transmission apparatus according to claim 49, further comprising a descrambling means for performing descrambling to said first type of frames with a frame synchronous scrambling sequence generated from a polynomial $g(x)=x^{43}+1$.

51. The data transmission apparatus according to claim 50, further comprising a pointer processing means for locating the start of the payload portion encapsulated in the third type of frames indicated by the pointer.

52. The data transmission apparatus according to claim 51, wherein said start flag and end flag are "0x7E".

53. The data transmission apparatus according to claim 52, wherein said de-framing means removes inter-frame fill, and wherein said de-framing means performs procedure of transparency processing.

54. The data transmission apparatus according to claim 53, wherein the received FCS field is verified by calculating FCS checksum over all octets between the start flag and the end flag with generating polynomial: $1+x+x^2+x^4+x^5+x^7+x^8+x^{10}+x^{11}+x^{12}+x^{16}+x^{22}+x^{23}+x^{26}+x^{32}$.

55. The data transmission apparatus according to claim 54, further comprises a overhead monitoring means for monitoring the overheads in said first type of frames for errors in states during the data receiving.

56. The data transmission apparatus according to claim 55, wherein said payload portion includes a plurality of sub-portions of payload for carrying said first type of frames.

57. The data transmission apparatus according to claim 56, wherein the end flag of a previous frame is the start flag of a subsequent frame next to said previous frame.

58. The data transmission apparatus according to claim 57, wherein said payload portion is a virtual container or contiguous and virtual concatenation of virtual containers, and virtual containers as the sub-portions of payload.

59. The data transmission apparatus according to claim 44, wherein said overheads include Path Trace(J1), path BIP-8(B3), signal label(C2) Path status(G1).

60. The data transmission apparatus according to claim 44, wherein said lower layer is a physical layer of SDH/SONET or simplified SDH/SONET.

61. The data transmission apparatus according to claim 44, wherein said upper layer is Ethernet MAC/GMAC layer, said first type of frames are SDH/SONET frames, said second type of frames are LAPS frames, and the third type of frames are MAC/GMAC frames.

62. The data transmission apparatus according to claim 44, wherein said data transmission apparatus is built in a SDH/SONET transmission device.

63. The data transmission apparatus according to claim 44, wherein said data transmission apparatus is built in an Ethernet switch device.

64. The data transmission apparatus according to claim 44, wherein said data transmission apparatus is an Ethernet switch device or an Ethernet/Fast Ethernet/Gigabit Ethernet L2/L3 switch or associated router.

65. The data transmission apparatus according to claim 44, wherein said Ethernet switch device is an Ethernet/Fast Ethernet/Gigabit Ethernet L2/L3 switch or associated router.

66. The data transmission apparatus according to claim 60, wherein said data transmission apparatus, for the purpose of rate adaptation, removes the programmable rate adaptation Gap fill byte existed in said second type of frames in a form of {0x7d, 0xdd}.

67. The data transmission apparatus according to claim 60, wherein said data transmission apparatus synchronizes the LAPS information field (MAC/GMAC frame) from SDH/SONET block to-RX_CLK at MII/GMII interface through transformer.

68. A data transmission method for transmitting data packets formed by a first type of frames from a lower layer side device to an upper layer side device, comprising steps of:
  receiving the data packets from said lower layer side device;
  removing the overheads of said first type of frames;
  extracting a SAPI field and the data contained in the information field from the payload portion of said first type of frames, to form a second type of frames;
  comparing the value of the SAPI field with a preset value, and determining to output the extracted data as it be if the value of the SAPI field data equals to said preset value;
  converting said second type of frames to a third type of frames corresponding to in said data packets; and
  transmitting the extracted data packets to said upper layer side device,
  wherein said upper layer is Ethernet MAC layer, said first type of frames are MAC frames, said second type of frames are LAPS frames, and the third type of frames are SDH/SONET frames.

69. The data transmission method according to claim 68, wherein each of said second type of frames including start flag, SAPI field, control field, information field, FCS field, and end flag.

70. The data transmission method according to claim 69, wherein said SAPI field is of one single octet, and said control field is of one single octet.

71. The data transmission method according to claim 68, wherein each of said second type of frames includes start flag, address field, control field, SAPI field including a SAPI identifier, information field including said data packets, FCS field, and end flag.

72. The data transmission method according to claim 71, wherein said address field is of one single octet, said control field is of one single octet, and said SAPI field is of two octets.

73. The data transmission method according to claim 70, further comprises of a step of receiving and buffering the input data packets, and adapting the rate of said lower layer side device to the rate of said upper layer side device.

74. The data transmission method according to claim 73, further comprising a step of performing descrambling to said first type of frames with a frame synchronous scrambling sequence generated from a polynomial $g(x)=x^{43}+1$.

75. The data transmission method according to claim 74, further comprising a step of locating the start of the payload encapsulated in the first type of frames indicated by the pointer.

76. The data transmission method according to claim 75, wherein said start flag and end flag are "0x7E", and said data transmission method further comprises a step of removing inter-frame fill.

77. The data transmission method according to claim 76, wherein the received FCS field is verified by calculating FCS checksum over all octets between the start flag and the end flag with generating polynomial: $1+x+x^2+x^4+x^5+x^7+x^8+x^{10}+x^{11}+x^{12}+x^{16}+x^{22}+x^{23}+x^{26}+x^{32}$.

78. The data transmission method according to claim 77, further comprises a step of monitoring the overheads in said third type of frames for errors in states during the data receiving.

79. The data transmission method according to claim 78, wherein said payload portion includes a plurality of sub-portions of payload carried by said first type of frames.

80. The data transmission method according to claim 79, wherein the end flag of a previous frame is the start flag of a subsequent frame.

81. The data transmission method according to claim 80, wherein said payload portion is a virtual container or contiguous and virtual concatenation of virtual containers, and virtual containers as the sub-portions of payload.

82. The data transmission method according to claim 68, wherein said overheads include Path Trace(J1), path BIP-8 (B3), signal label(C2) Path status(G1) in a way of single virtual container or concatenation.

83. The data transmission method according to claim 68, wherein said lower layer is a physical layer of SDH/SONET or simplified SDH/SONET.

84. The data transmission method according to claim 68, wherein said upper layer is Ethernet MAC/GAMC layer, said first type of frames are SDH/SONET frames, said second type of frames are LAPS frames, and the third type of frames are MAC/GMAC frames.

85. The data transmission method according to claim 84, wherein said Ethernet layer is an Ethernet layer of IEEE 802.3/802.3u/802.3z.

86. The data transmission method according to claim 83, for the purpose of rate adaptation, further comprises a step of removing the programmable rate adaptation Gap fill byte existed in said second type of frames in a form of {0x7d, 0xdd}.

87. The data transmission method according to claim 83, further comprises a step of synchronizing the LAPS information field (MAC/GMAC frame) from SDH/SONET block to RX_CLK at MII/GMII interface through transformer.

88. The data interfacing apparatus according to claim 44, further comprising a line side interfacing means for transmitting/receiving data packets from lower layer side device.

89. The data interfacing apparatus according to claim 88, further comprising a transforming means for synchronizing the data packets of said upper layer side device with data packets input to said first receiving means in the transmission direction, and for synchronizing the extracted data packets from said second transmitting means with the data packets of said upper layer side device in the receiving direction.

90. The data interfacing apparatus according to claim 89, further comprising a microprocessor interfacing means for enabling said data interfacing apparatus to access all registers within it; a JTAG port for testing; and a GPIO register for temporal buffering input/output configuration data.

91. A data interfacing apparatus for transmitting data packets between a upper layer side device and a lower layer side device, comprising:
   a first receiving means for receiving the data packets from said upper layer side device, and converting said data packets to a first type of frames;
   a first processing means for encapsulating said first type of frames to form a second type of frames containing a SAPI field including a SAPI identifier and an information field including said data packets;
   a second processing means for encapsulating said second type of frames into a payload portion, inserting appropriate overheads corresponding to said data packets, so as to form a third type of frames;
   a first transmitting means for outputting said third type of frames to the lower layer side device;
   a second receiving means for receiving the data packets from said lower layer side device;
   a de-framing means for removing the overheads of said first type of frames;
   a third processing means for extracting a SAPI field and the data contained in the information field from the payload portion of said first type of frames, to form said second type of frames;
   a determining means for comparing the value of the SAPI field with a preset value, and determining to output the extracted data as is, if the value of the SAPI field data equals to said preset value;
   a fourth processing means for converting said second type of frames to a third type of frames corresponding to in said data packets; and
   a second transmitting means for transmitting the extracted data packets to said upper layer side device.

* * * * *